United States Patent
French et al.

(10) Patent No.: US 10,957,228 B2
(45) Date of Patent: Mar. 23, 2021

(54) IMAGE MODULATION APPARATUS

(71) Applicant: Rockwell Collins, Inc., Cedar Rapids, IA (US)

(72) Inventors: Paul French, Hurstpierpoint (GB); John Harding, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/771,369

(22) PCT Filed: Oct. 27, 2016

(86) PCT No.: PCT/US2016/059229
§ 371 (c)(1),
(2) Date: Apr. 26, 2018

(87) PCT Pub. No.: WO2017/075291
PCT Pub. Date: May 4, 2017

(65) Prior Publication Data
US 2018/0308401 A1 Oct. 25, 2018

(30) Foreign Application Priority Data

Oct. 28, 2015 (GB) .................................. 1519103.4

(51) Int. Cl.
*G09G 3/00* (2006.01)
*H04N 9/31* (2006.01)
(Continued)

(52) U.S. Cl.
CPC ............... *G09G 3/002* (2013.01); *H04N 5/57* (2013.01); *H04N 9/3126* (2013.01);
(Continued)

(58) Field of Classification Search
CPC .......... G09G 3/002; G09G 2320/0233; G09G 2310/027; H04N 9/3126; H04N 9/3182; H04N 5/57; G03B 21/005; G03B 21/206
See application file for complete search history.

(56) References Cited

U.S. PATENT DOCUMENTS 5,969,710 A 10/1999 Doherty et al.
7,551,341 B1 * 6/2009 Ward .................... G03B 33/08
359/259

(Continued)

OTHER PUBLICATIONS

International Search Report and Written Opinion of Application No. PCT/US2016/059229, dated Feb. 27, 2017, 9 pages.
(Continued)

*Primary Examiner* — Kent W Chang
*Assistant Examiner* — Andrew Lee
(74) *Attorney, Agent, or Firm* — Suiter Swantz pc llo

(57) ABSTRACT

A projector includes a first light modulator having first pixels, a second light modulator having second pixels, and a processing circuit. The processing circuit is configured to determine whether to control the spatial light modulators in a high-end mode or a low-end mode based on a video demand indicating greyscale levels. In high-end mode, at least one first pixel is driven in an ON state for at least a fraction of a frame time that a corresponding second pixel is in the ON state, the fraction determined based on the greyscale level. In the low-end mode, the at least one first pixel is driven in an OFF state while the corresponding second pixel is driven between ON and OFF states. The fraction that the second pixel is in the ON state is increased to compensate for driving the at least one first pixel in the OFF state.

20 Claims, 12 Drawing Sheets

(51) Int. Cl.
*H04N 5/57* (2006.01)
*G03B 21/00* (2006.01)
*G03B 21/20* (2006.01)

(52) U.S. Cl.
CPC ......... *H04N 9/3182* (2013.01); *G03B 21/005* (2013.01); *G03B 21/206* (2013.01); *G09G 2310/027* (2013.01); *G09G 2320/0233* (2013.01)

(56) References Cited

U.S. PATENT DOCUMENTS

| | | |
|---|---|---|
| 2003/0142274 A1 | 7/2003 | Gibbon et al. |
| 2004/0001184 A1 | 1/2004 | Gibbons et al. |
| 2008/0246705 A1* | 10/2008 | Russell .............. G02B 26/0833 345/82 |
| 2010/0253863 A1 | 10/2010 | Harding et al. |
| 2012/0068978 A1* | 3/2012 | Aitken ................. G09G 3/3406 345/207 |
| 2014/0085562 A1 | 3/2014 | Bloom et al. |
| 2014/0333835 A1 | 11/2014 | Richards et al. |
| 2016/0004219 A1* | 1/2016 | Leister .................... G02B 5/32 359/9 |

OTHER PUBLICATIONS

European Search Report and Written Opinion of Application No. 16860843.8 dated Jun. 13, 2019, 9 pages.

* cited by examiner

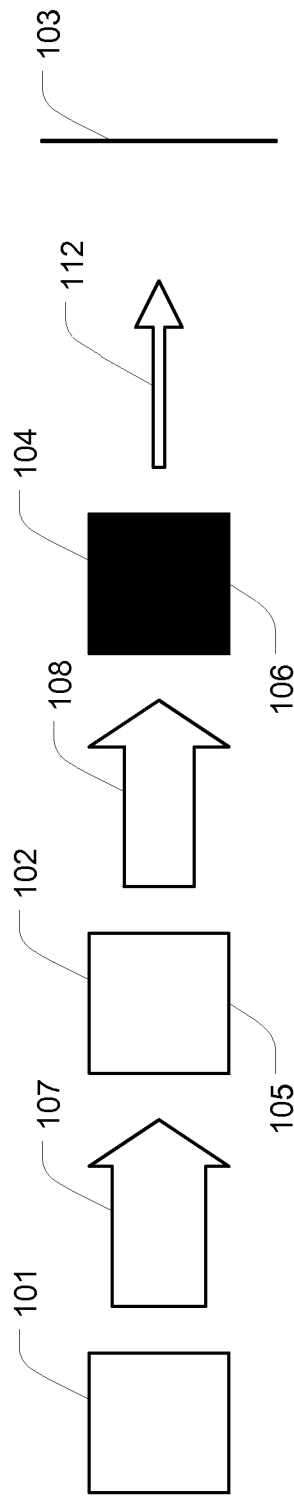
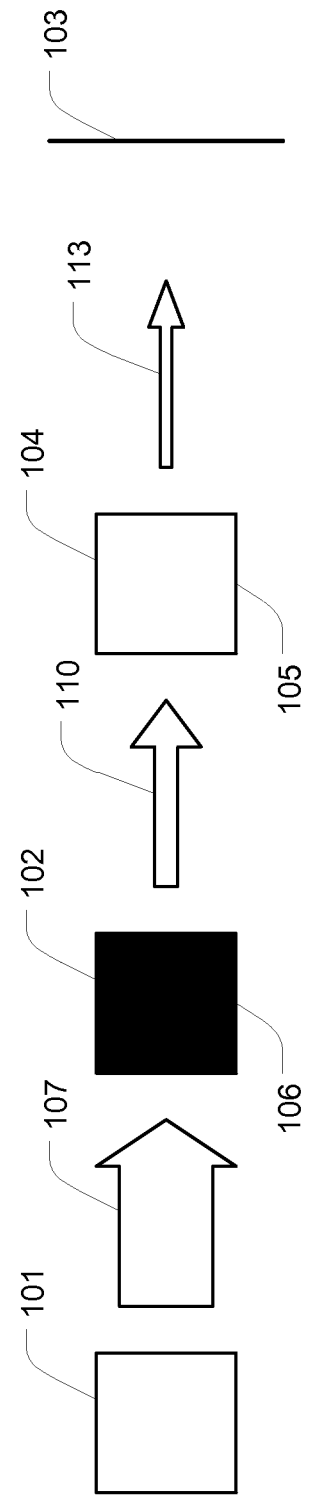

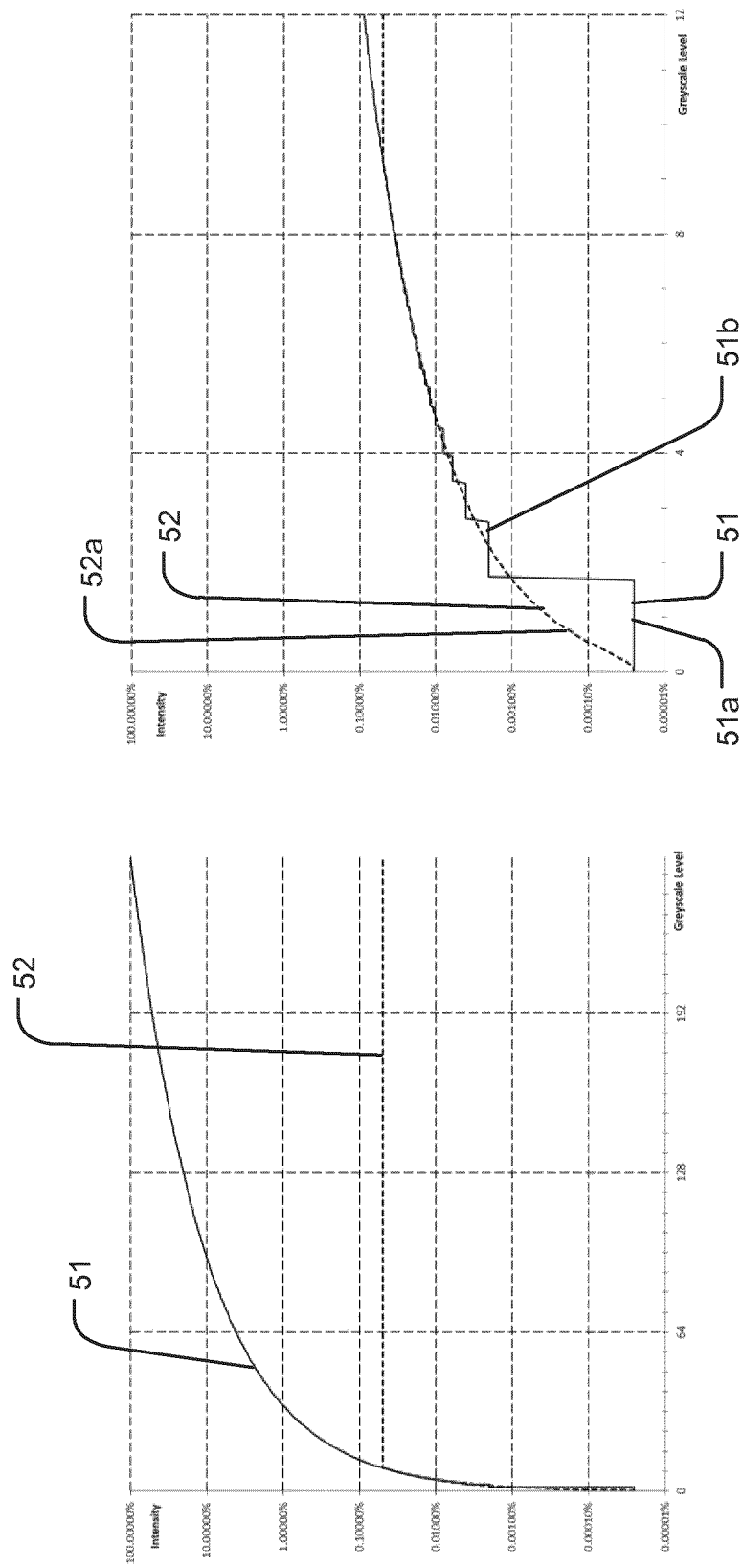

IMAGE MODULATION APPARATUS

CROSS-REFERENCE TO RELATED APPLICATIONS

This present application is a national stage entry of International Patent Application No. PCT/US2016/059229, titled "Image Modulation Apparatus," filed Oct. 27, 2016, which claims the benefit of and priority to GB Patent Application No. 1519103.4, titled "Image Module Apparatus," filed Oct. 28, 2015, each of which is incorporated herein by reference in its entirety.

TECHNICAL FIELD

The present disclosure relates to image modulation apparatus and, more particularly, to an image modulation apparatus which is for use in an image display apparatus.

BACKGROUND

For image display or modulation apparatuses required to display good night scenes, for example in planetariums or flight simulators, it is desirable to have a very dim black (or OFF) state. For displays formed of multiple overlapping images, a very dim black state is also desirable to avoid visible double brightness in the overlaps. In existing image display systems, spatial light modulators (SLMs) are used and they have a non-zero black state light leakage. To suppress this leakage, two spatial light modulators can be operated optically in series. This has been used successfully for some time with spatial light modulators that have analogue-type pixels, i.e. pixels that can vary continuously between ON and OFF states.

Other spatial light modulators have binary pixels, which only have two states, i.e. ON and OFF. These spatial light modulators achieve intermediate modulation values by rapidly switching pixels between ON and OFF, spending an appropriate fraction of the frame time in the ON state. However, their pixels also have a finite minimum ON time (e.g., the pixel must be held in the ON state for a period of time before it can be in the OFF state, resulting in a finite amount of light to pass through). When operated optically in series, this minimum ON time results in large steps in output light intensity near the low (black) end of the modulation range.

SUMMARY

In one aspect, the inventive concepts disclosed herein are directed to a projector. The projector includes a first spatial light modulator including a plurality of first pixels. Each first pixel has an ON state and an OFF state. The projector includes a second spatial light modulator optically coupled to the first spatial light modulator to receive light from the first spatial light modulator. The second spatial light modulator includes a plurality of second pixels. Each second pixel has an ON state and an OFF state. Each second pixel corresponds to at least one first pixel. The projector includes a processing circuit configured to determine whether to control the pixels of the spatial light modulators in a high-end mode or a low-end mode based on a video demand indicating greyscale levels for light output by the projector. In the high-end mode, the processing circuit is configured to drive the at least one first pixel in the ON state for at least all of a fraction of a frame time that the corresponding second pixel is in the ON state, the fraction of the frame time determined based on the greyscale level. In the low-end mode, the processing circuit is configured to drive the at least one first pixel in the OFF state while driving the corresponding second pixel between the ON and OFF states. The fraction of the frame time for which the second pixel is in the ON state is increased to compensate for the at least one first pixel being in the OFF state.

In a further aspect, the inventive concepts disclosed herein are directed to a system. The system includes a generator module, a first control module, and a second control module. The generator module is configured to generate a first modulator control signal indicating a first fraction of a frame time for driving at least one first pixel of a first spatial light modulator in an ON state, a second modulator control signal indicating a second fraction of a frame time for driving a second pixel of a second spatial light modulator in an ON state, the second pixel corresponding to the at least one first pixel, and a mode signal indicating a high-end mode or a low-end mode. The first control module is configured to control operation of a first spatial light modulator based on the first modulator control signal and the mode signal, wherein in the high-end mode, the first control module is configured to output the first modulator control signal to the first spatial light modulator, and in the low-end mode, the first control module is configured to drive the at least one first pixel in an OFF state. The second control module is configured to control operation of a second spatial light modulator based on the second modulator control signal and the mode signal. In the high-end mode, the second control module is configured to output the second modulator control signal to the second spatial light modulator. In the low-end mode, the second control module is configured to increase the second fraction when outputting the second modulator control signal to the second spatial light modulator to compensate for the OFF state of the first spatial light modulator.

In a further aspect, the inventive concepts disclosed herein are directed to a method. The method includes generating a mode signal indicating whether to drive a first pixel of a first spatial light modulator and a second pixel of a second spatial light modulator according to a high-end mode or a low-end mode based on a video demand signal. The second pixel corresponds to the first pixel. Each pixel is configured to be in an ON state for a fraction of a frame time. In the high-end mode, the method includes driving the first pixel and the second pixel synchronously based on the video demand signal. In the low-end mode, the method includes driving the first pixel in the OFF state while driving the second pixel with an increased fraction of the frame time relative to the high-end mode to compensate for the first pixel being driven in the OFF state.

BRIEF DESCRIPTION OF THE DRAWINGS

Implementation of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1C is a schematic diagram of an exemplary embodiment of an image modulation apparatus with a first spatial light modulator operated in an ON state and a second spatial light modulator operated in an OFF state according to the inventive concepts disclosed herein;

FIG. 1D is a schematic diagram of an exemplary embodiment of an image modulation apparatus with a first spatial light modulator operated in an OFF state and a second spatial light modulator operated in an ON state according to the inventive concepts disclosed herein;

FIG. 2A is a chart illustrating an exemplary embodiment of a full image intensity response range for an image modulation apparatus according to the inventive concepts disclosed herein;

FIG. 2B is a chart illustrating an exemplary embodiment of a low-end image intensity response range for an image modulation apparatus according to the inventive concepts disclosed herein;

DETAILED DESCRIPTION

Figure 1A:
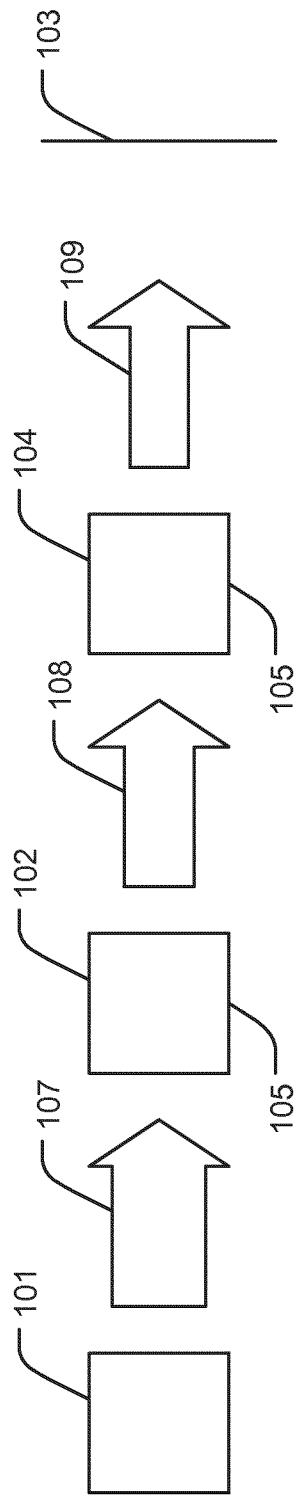
FIG. 1A is a schematic diagram of an exemplary embodiment of an image modulation apparatus being operated with two spatial light modulators in an ON state according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts herein are directed to systems and methods for an image modulation apparatus, such as an image modulation apparatus for simulation and night vision training. The inventive concepts disclosed herein can be utilized in various applications, including image modulation apparatuses, projectors, software, firmware, or hardware for projectors, high contrast projectors, spatial light modulators, including spatial light modulators that incorporate a digital micromirror (DMD)

device, spatial light modulators that use reflective pixels, and/or spatial light modulators that use transmissive pixels.

In some embodiments, a projector includes a first spatial light modulator including a plurality of first pixels. Each first pixel has an ON state and an OFF state. The projector includes a second spatial light modulator optically coupled to the first spatial light modulator to receive light from the first spatial light modulator. The second spatial light modulator includes a plurality of second pixels. Each second pixel has an ON state and an OFF state. Each second pixel corresponds to at least one first pixel. The projector includes a processing circuit configured to determine whether to control the pixels of the spatial light modulators in a high-end mode or a low-end mode based on a video demand indicating greyscale levels for light output by the projector. In the high-end mode, the processing circuit is configured to drive the at least one first pixel in the ON state for at least all of a fraction of a frame time that the corresponding second pixel is in the ON state, the fraction of the frame time determined based on the greyscale level. In the low-end mode, the processing circuit is configured to drive the at least one first pixel in the OFF state while driving the corresponding second pixel between the ON and OFF states. The fraction of the frame time for which the second pixel is in the ON state is increased to compensate for the at least one first pixel being in the OFF state.

Projectors and other systems manufactured in accordance with the inventive concepts disclosed herein can avoid large steps between intensity levels for outputting light, producing a smoothly varying output from a smoothly varying input, even near black. According to the present disclosure, binary spatial light modulators optically arranged in series can be operated in two modes: a "high-end" mode (e.g., normal mode, first mode) for pixels modulating bright parts of the image; and a "low-end" mode (e.g., second mode) for pixels modulating dark parts of the image. For example, where a pixel utilizes both modulators in the ON state to produce the required intensity, this is referred to as normal or high end mode. Where a pixel utilizes one modulator in the OFF state and one modulator in the ON state to produce the required intensity, this is referred to as low end mode. As will be appreciated, the term "pixel" can refer to an individual picture element of a spatial light modulator or of an image output by or modulated by a spatial light modulator, as well as an individual picture element of an image outputted or displayed by an image modulation apparatus or an image display apparatus incorporating the image modulation apparatus.

In high-end mode, corresponding pixels in each spatial light modulator (SLM) are operated synchronously (e.g., in a normal mode as operated in existing systems that do not provide the multiple mode features according to the inventive concepts disclosed herein). For example, pixels of one spatial light modulator can be switched between ON and OFF states at the same time as pixels of the other spatial light modulator. In some embodiments, such as where optical blur, misalignment, dissimilar numbers of pixels, and/or dissimilar sizes of pixels may be present between the two spatial light modulators such that there is no longer a one-to-one correspondence between the spatial light modulators, in high-end mode, pixels of one spatial light modulator may be ON for at least all the time that pixels of the other spatial light modulator are ON, and switched between ON and OFF states at the same time. Corresponding pixels of the first and second spatial light modulators may be those pixels receiving analogous image information from input video data such that those pixels are controlled to cooperate in order to generate the same output information. Corresponding pixels may include fractional correspondence (e.g., light output by a first pixel of a first SLM only falls on a part of a second pixel of a second SLM, or vice versa). Pixels of the SLMs may correspond even where the SLMs have different resolution, panel sizes, and/or aspect ratios.

In low-end mode, pixels in one of the SLMs are switched OFF while their corresponding pixels in the other SLM continue to switch between states to modulate leakage light (e.g., light that passes through the pixels due to the finite minimum ON time) from the OFF pixels. In some implementations that do not incorporate the inventive concepts disclosed herein, this two-mode operation would produce an unacceptably large visible drop in output light intensity on crossing the transition from high-end mode to low-end mode, as described further with reference to FIGS. 2A-2B.

The inventive concepts disclosed herein advantageously increase the ON time for those pixels in the spatial light modulator that modulate the leakage light from the other spatial light modulator, to compensate for the otherwise undesired decrease in output light intensity that would occur between operating corresponding pixels in high-end mode and operating those pixels in low-end mode. As such, systems manufactured in accordance with the inventive concepts disclosed herein can advantageously provide a smooth transition between modes and a smooth variation of modulation across the whole modulation range.

In some embodiments, the image modulation apparatus is configured to adjust for pixel misalignment. For example, the image modulation apparatus can include a processing circuit configured to control the spatial light modulators to operate a region or "window" of pixels around a target pixel (e.g., target pixel for outputting light at a relatively bright intensity) in high-end mode. In connection with the window concept, it is mentioned that complications may arise when two spatial light modulators cannot be exactly optically imaged onto each other, such that pixels in one spatial light modulator do not have exactly spatially corresponding pixels in the other spatial light modulator. This may result in some or all of a low-end pixel on one spatial light modulator being imaged onto a high-end mode pixel on the other spatial light modulator, or vice versa. An image modulation apparatus according to the inventive concepts disclosed herein can solve this problem by effectively opening the relatively small high-end mode window around bright pixels, such that smaller features are not dimmed by the misalignment. While in some embodiments, such a method of operation may cause a halo effect, the halo effect can be masked by finite blur in the other parts of the optical path, and the window may only be open for the bright pixel's fraction of the frame time.

Referring now to FIG. 1A, a schematic diagram of an image modulation apparatus 100 is shown according to an exemplary embodiment of the inventive concepts disclosed herein. The image modulation apparatus 100 includes a first spatial light modulator 102 (SLM 102) and a second spatial light modulator 104 (SLM 104). The image modulation apparatus 100 can be part of an image display apparatus (e.g., a projector) and include and/or be optically coupled to a light source 101 and a screen 103. The first SLM 102 is upstream of the second SLM 104 in an optical path from the light source 101 to the screen 103, such that light 107 from the light source 101 is modulated by the first SLM 102, then outputted to the second SLM 104 for further modulation, then outputted to the screen 104. Various features of embodiments of image modulation apparatuses and image display apparatuses as described further herein with reference to FIGS. 6-9. Briefly, each SLM can include an array or plurality of pixels that can be modulated between ON and OFF states. While FIGS. 1A-1D illustrate the SLMs 102, 104 as a single entity, it is appreciated that the inventive concepts disclosed herein can be applied to individual pixels or groups of pixels based on image information for driving those pixels.

As shown in FIG. 1A, the first SLM 102 (or one or more pixels thereof) is in an ON state 105, and the second SLM 104 (or one or more pixels thereof) is in an ON state 105. Light 107 from the light source 101 is passed through by the first SLM 102 as first modulated light 108 to the second SLM 104 (e.g., in a DMD-type SLM, a mirror of the first SLM 102 reflects the light 107 as first modulated light 108 to the second SLM 104), and second modulated light 109 from the second SLM 104 is then passed through to the screen 103. The first modulated light 108 and second modulated light 109 resulting from SLMs driven in the ON state may be referred to as "pass through" and "pass through of pass through," respectively.

In some embodiments, the image modulation apparatus 100 is operated in high-end mode according to the configuration illustrated in FIG. 1A. Corresponding pixels of the first SLM 102 and second SLM 104 are operated, controlled, modulated, and/or driven synchronously. For example, the SLMs 102, 104 can be switched in an identical fashion so that both SLMs are synchronized and opened and closed together (a delay may be applied to the control signals transmitted to each of the SLMs 102, 104, to account for delays caused by signal delay or other processing steps, in order to synchronize the SLMs 102, 104).

A first pixel of the first SLM 102 may correspond to a second pixel of the second SLM 104 based on a geometric structural configuration of the image modulation apparatus 100. For example, due to practical considerations of a projector having two SLMs in series, such as in image modulation apparatus 100, light reflected by a first pixel of the first SLM 102 may pass to more than one second pixel of the second SLM 104. Similarly, in some embodiments, light reflected from multiple first pixels of the first SLM 102 may pass to the same second pixel of the second SLM 104. As such, pixels between two SLMs in series may correspond to one another (or be associated with one another) where light reflected by first pixels of the first SLM 102 reaches particular second pixels of the second SLM 104 (e.g., an amount of light from a first pixel having an intensity greater than a nominal or minimum intensity reaches a second pixel).

In some embodiments, the first SLM 102 and the second SLM 104 consist of arrays of pixels having the same arrangement of pixels (each, each SLM includes an array of m-by-n pixels), each pixel being the same size. Even so, the first pixels of the first SLM 102 and the second pixels of the second SLM 104 may not have a one-to-one correspondence due to misalignment, blur, or other considerations for an image display apparatus. In other embodiments, the first SLM 102 and the second SLM 104 may have a different arrangement of pixels, and/or pixels having different sizes; first pixels of the first SLM 102 and second pixels of the second SLM 104 may be corresponding based on whether light from the first pixels reaches the second pixels and/or based on whether an input video signal used to control operation of the pixels causes those pixels to cooperate to output the same feature in the output image.

As shown in FIG. 1A, in high-end mode, light forming an image is output to the screen 103 when the first SLM 102 and the second SLM 104 are driven in or set to the ON state. The width of the arrows illustrating the light 107, 108, 109 indicates how the intensity of the first modulated light 108 is slightly less than the intensity of the light 107 from the light source 101, and the intensity of the second modulated light 109 is slightly less than the intensity of the first modulated light 108. The high-end mode can represent a "normal" mode of operation, where if light is to be output to form an image, both SLMs are driven in the ON state to output the light. The high-end mode can be performed by alternately driving the SLMs in the ON state 105 as shown in FIG. 1A and the OFF states 106 as shown in FIG. 1B as described below.

Figure 1B:
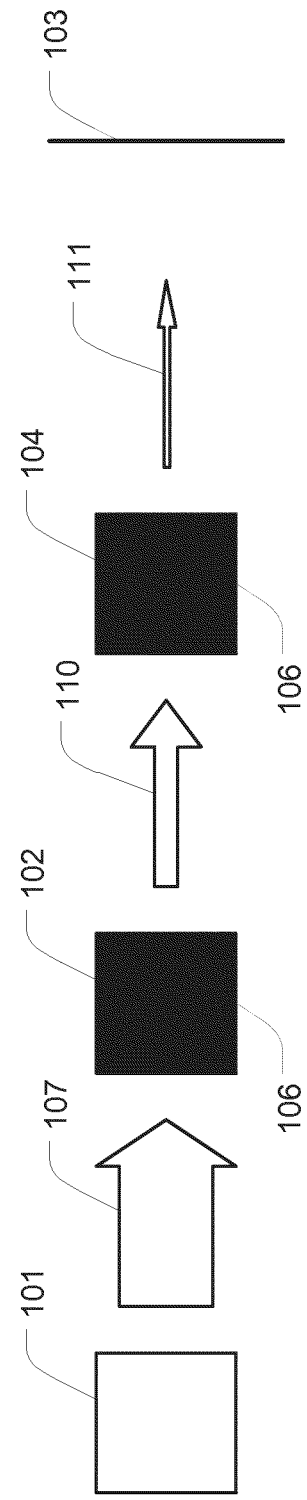
FIG. 1B is a schematic diagram of an exemplary embodiment of an image modulation apparatus with two spatial light modulators operated in an OFF state according to the inventive concepts disclosed herein.

Referring now to FIG. 1B, a schematic diagram of the image modulation apparatus 100 is shown according to an exemplary embodiment of the inventive concepts disclosed herein. As compared to FIG. 1A, in FIG. 1B, the first SLM 102 and second SLM 104 are driven in or set to the OFF state, such that light received by the SLMs is prevented from passing through to downstream components of the image modulation apparatus (e.g., where the SLMs incorporate micromirror devices, the mirrors of the first SLM 102 may reflect light away from the second SLM 104; the second SLM 104 may reflect light away from the screen 103). As shown by the width of the arrows for the light in the optical path of FIG. 1B, due to the finite minimum ON time of the first SLM 102, some of the light 107 goes through the first SLM 102 as first light 110 (e.g., first modulated light), and due to the finite minimum ON time of the second SLM 104, some of the first light 110 goes through the second SLM 104 as second light 111 (e.g., second modulated light). The first light 110 and second light 111 may be referred to as "leakage" and "leakage of leakage," respectively. The configuration shown in FIG. 1B may be used for outputting a fully OFF or maximally black portion of an image for either the high-end mode or the low-end mode, as will be described with further reference to FIGS. 1C-1D below. For example, with regards to high-end mode, a greyscale range, for a frame of an image, from maximum intensity (e.g., full ON, white, or close to white) to minimum intensity (e.g., full OFF, black, or close to black) can be achieved by controlling the fraction of time corresponding pixels are driven in the ON/ON configuration of FIG. 1A or the OFF/OFF configuration of FIG. 1B. The perceived intensity of a pixel is proportional to the ratio of ON state time to video frame time.

In various embodiments of an image display apparatus according to the inventive concepts disclosed herein, such a dual SLM approach can significantly reduce the projector's full OFF level (leakage of leakage) relative to a single SLM approach, yet only slightly reduce the full ON level (pass through of pass through). As such, the contrast ratio of the image display apparatus (e.g., of a projector incorporating two SLMs) can be significantly increased.

In various embodiments, the inventive concepts disclosed herein may apply to a variety of SLM configurations, such as configurations incorporating a plurality of first SLMs 102 (e.g., more than one first stage SLM) and/or a plurality of second SLMs 104 (e.g., more than one second stage SLM). For simplicity of explanation and illustration, one SLM in each stage is discussed. However a similar approach may be used, for example if the first stage uses one SLM and the second stage uses three SLM. For example, the inventive concepts disclosed herein can be implemented in configurations using colour sequential or colour parallel designs using dual two-stage DMD SLMs. Similarly, the issues apply to modulating visible light (e.g., white or red, green and blue light) or non-visible light (e.g., infrared light, ultraviolet light). The inventive concepts disclosed herein can be implemented in a four channel visible and non-visible system (e.g., red, green, blue, and infrared), such as for night vision training simulation.

As described herein, SLMs such as the first SLM 102 and second SLM 104 have a limited minimum ON or OFF time. In some embodiments, the limited minimum ON or OFF time may be addressed by dithering intensity over a number of video frames. However, there will still be a step in intensity from the full off level (black) to the smallest grey level that can be produced if both SLMs always open and close together. In such configurations, an image display apparatus may be unable to faithfully (e.g., accurately, with proper fidelity) reproduce images with low end grey levels (e.g., an image may require a particular pixel to have a grey level that is greater in intensity than full black but lesser in intensity than the lowest grey level the image display apparatus is capable of outputting by opening and closing both SLMs in a high-end mode as shown in FIGS. 1A-1B). A single SLM would have similar limitations.

Referring now to FIGS. 1C-1D, in some embodiments, the image modulation apparatus 100 is configured to operate in a low-end mode where one of the SLMs is driven in the ON state while the other SLM is modulated between ON and OFF states to output light having an intensity more accurately corresponding to the grey level of the image. For example, to faithfully reproduce low end grey scale levels, a dual SLM projector can utilize an additional state where one modulator is ON while the other modulator is OFF.

As shown in FIG. 1C, in some embodiments, low-end mode can be achieved by driving the first SLM 102 in the ON state 105 while driving the second SLM 104 in the OFF state 106 (the first SLM 102 can be modulated between the ON state 105 and the OFF state 106 as shown in FIG. 1B in order to achieve the grey scale level indicated by an input signal for an image to be displayed). The first SLM 102 receives light 107 from the light source 101, and outputs first modulated light 108 to the second SLM 104. The second SLM 104 then outputs second modulated light 112 to the screen 103; the second modulated light 112 will have an intensity that could not be achieved (e.g., less than a threshold value as will be described further with reference to FIGS. 2A-2B) by switching the SLMs 102, 104 between the high-end mode ON state of FIG. 1A and the high-end mode OFF state of FIG. 1B.

As shown in FIG. 1D, in some embodiments, low-end mode can also be achieved by driving the first SLM 102 in the OFF state 106 while driving the second SLM 104 in the ON state 105 (the second SLM 102 can be modulated between the ON state 105 and the OFF state 106 as shown in FIG. 1B in order to achieve the grey scale level indicated by an input signal for an image to be displayed). The first SLM 102 receives light 107 from the light source 101, and outputs first light 110 (e.g., leakage light, first modulated light) to the second modulator 104. The second SLM 104 then outputs second modulated light 113 to the screen 103. Similar to the configuration shown in FIG. 1C, the second modulated light 113 will have an intensity that could not be achieved (e.g., less than a threshold value as will be described further with reference to FIGS. 2A-2B) by switching the SLMs 102, 104 between the high-end mode ON state of FIG. 1B and the high-end mode OFF state of FIG. 1B.

In various embodiments, the intensity of light output by the image modulation apparatus 100 may be similar for either the configuration shown in FIG. 1A, where the first SLM 102 is ON and the second SLM 104 is OFF, or the configuration shown in FIG. 1B, wherein the first SLM 102 is OFF and the second SLM 104 is ON. In some embodiments, the configuration shown in FIG. 1B provides a more resolute image.

In some embodiments, a fraction of a frame time for which a pixel of an SLM is driven in the ON state corresponds to the intensity of light output by the pixel. The SLMs 102, 104 are configured to be driven by a drive signal (e.g., control signal, image information, video information, image data, video data) and, responsive to the drive signal, individually switch each pixel between the ON state and the OFF state. By rapidly switching pixels between the two states of ON/OFF (e.g., as shown in FIG. 1C, or similarly for the OFF/ON state of FIG. 1D) and OFF/OFF (e.g., as shown in FIG. 1B) within a video frame time, and by varying the proportion of time between the two states, the present solution advantageously enables the image modulation apparatus 100 to achieve low end grey scales between low end full ON (full low end grey) and full OFF (black) that cannot be achieved by existing systems operating in high-end (e.g., normal) mode.

In some embodiments, the image modulation apparatus 100 is configured to increase the fraction of the frame time for which the ON state SLM is driven in the ON state. For example, with reference to the configuration shown in FIG. 1D, the second SLM 104 can be configured to be driven in the ON state for a greater fraction of the frame time than indicated by image information used to determine a driven signal for controlling the second SLM 104 (e.g., a greater fraction of the frame time than would have been used in high-end mode). Driving a pixel in low-end mode can result in less light from the image modulation apparatus for a given period of time than would be the case for the high-end mode of operation, as the first SLM 102 is driven in the OFF state rather than the ON state (e.g., the second light 113 is pass through of leakage), which can reduce the effectiveness of low-end mode. Thus in low-end mode, the ON time of the ON state SLM can be increased (relative to high-end mode) to compensate. Similarly, for the configuration shown in FIG. 1C, the fraction of the frame time for which the first SLM 102 is driven in the ON state can be increased to compensate for the fact that the second light 112 is leakage of pass through.

In some embodiments, the image modulation apparatus 100 is configured to faithfully reproduce a full grey scale from black (e.g., full black, minimum intensity), through low end grey scale levels (e.g., by operating the image modulation apparatus 100 in low-end mode by switching between the configurations shown in FIG. 1B and FIG. 1C), through high-end grey scale levels (e.g., by operating the image modulation apparatus in high-end mode by switching between the configurations shown in FIG. 1A and FIG. 1B), to full ON/white (e.g., by operating the image modulation apparatus 100 in the configuration shown in FIG. 1A). For example, the image modulation apparatus 100 can be driven in three operational states depending on the grey scale level indicated by image information: full OFF (e.g., FIG. 1B); low-end (e.g., FIG. 1C or FIG. 1D); and full ON (e.g., FIG. 1A).

For example, by rapidly switching a pixel between the two states shown in FIGS. 1A and 1B (high-end mode ON and OFF states) within a video frame time and by varying the proportion of time between the two states, it is possible to produce high end grey scales between full ON (white) and full OFF (black). By rapidly switching a pixel between the two states of FIGS. 1D and 1B (low-end mode ON and OFF states) within a video frame time and varying the proportion of time between the two states, it is possible to produce low end grey scales down to and including full OFF (black). Within a video frame, a pixel could combine all three states. Additionally, using the state of FIG. 1C is possible, although this may add little benefit as the configuration of FIG. 1D results in a more resolute image.

Referring now to FIGS. 2A-2B, exemplary embodiments of grey scale response functions (e.g., discrete levels of light intensity that can be achieved according to the inventive concepts disclosed herein) for the image modulation apparatus 100 are shown. The response function is based on the fraction of frame time that corresponding pixels of each SLM 102, 104 are driven in the ON state. FIGS. 2A-2B illustrate response functions for an 8-bit input drive signal (as will be appreciated, the inventive concepts disclosed herein may be applied to input signals of various bit depths). For an 8-bit input drive signal, 256 grey scale levels may be provided, such as from a grey scale level of zero, corresponding to full OFF (e.g., black), to a grey scale level of 255, corresponding to full ON (e.g., white). FIG. 2A illustrates a full response range from a grey scale level of zero to a grey scale level of 255. FIG. 2B illustrates a response range from a grey scale level of zero to a grey scale level of 12.

In FIGS. 2A and 2B, an embodiment of a high-end mode response 51 is shown by a solid line, and an embodiment of a low-end mode response 52 is shown by a dashed line. While the high-end mode response 51 works well over most of the grey scale levels, it may have a poor response for lower grey scale levels (e.g., for the example shown in FIGS. 2A-2B, for grey scale levels 0 to 4). In existing systems that only operate in high-end mode, the image display apparatus may not faithfully reproduce lower intensity pixels that are required for simulation applications, to allow realistic night time training scenarios, electronic edge blending, electronic uniformity, and black level insertion. For example, as indicated by the large step in intensity between the high-end mode response levels 51a, 51b, existing systems cannot achieve light intensity levels between the response level 51a, 51b. However, by operating an image modulation apparatus in low-end mode for low grey scale levels, as shown in FIG. 2B, a light intensity level 52a between the levels 51a, 51b can be achieved.

In some embodiments, the low-end response may only usable up to around a threshold grey scale level (e.g., level 9 for the embodiments shown in FIGS. 2A-2B), after which point it does not get any brighter. For example, in a configuration as shown in FIG. 1D, where the second SLM 104 modulates leakage light from the first SLM 102, the maximum intensity of light that can be output by the image modulation apparatus 100 will the intensity of the leakage light 110 (which may be decreased further when passed through by the second SLM 102). However, in low-end mode, the image modulation apparatus performs well below such a threshold grey scale level, for example especially between levels 0 to 4 for the embodiments shown in FIGS. 2A-2B. For a given image display apparatus according to the inventive concepts disclosed herein, the actual response characteristics may depend on such parameters as display gamma, the minimum ON time of the SLMs, and the amount of dither used.

In some embodiments, and as will be described further with reference to FIG. 4, the image display apparatus is configured to determine whether to operate (e.g., drive one or more pixels) in high-end mode or low-end mode based on a response function for the SLMs of the image modulation apparatus 100, such as a response function depending on the parameters described herein. For example, the image modulation apparatus may be configured to determine whether to operate in high-end mode or low-end mode based on a grey scale level indicated by the image information. For example, if the grey scale level is less than or equal to a threshold level (e.g., a level at which the low-end response has greater fidelity to the image information, or a level at which the grey scale level cannot increase any more, such as level 6 for embodiments similar to those shown in FIGS. 2A-2B), then use low-end mode; otherwise use high-end mode. In various embodiments similar to those shown in FIGS. 2A-2B, a switching point may be anywhere between levels 4 and 9 (e.g., levels where the high-end mode and low-end mode have similar responses, as shown in FIG. 2B). Thus the rule could adapt dependent on factors such as the grey scale level of surrounding pixels.

Figure 3A:
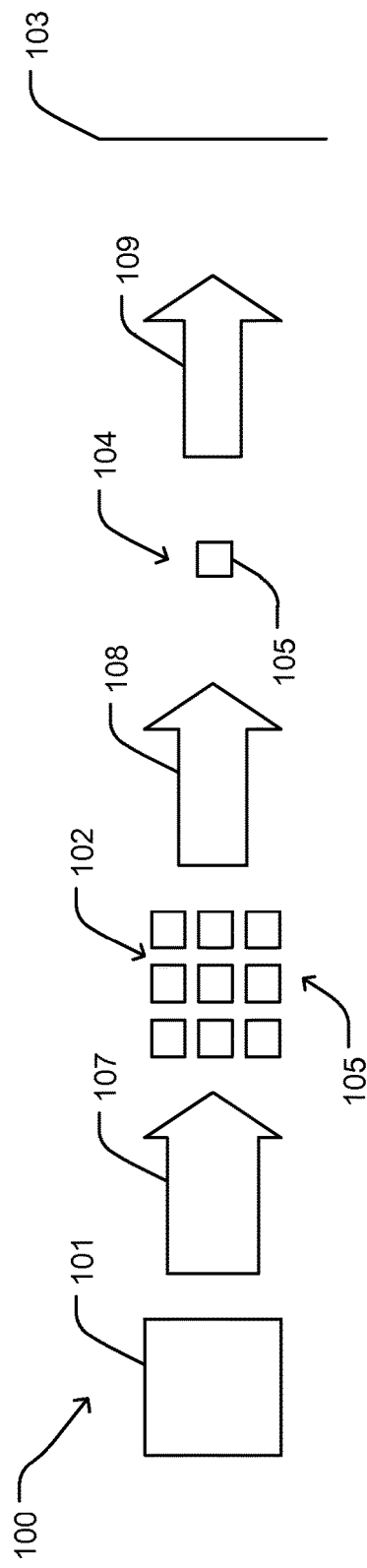
FIG. 3A is a schematic diagram of an exemplary embodiment of pixels of first and second spatial light modulators being driven in a high-end mode according to the inventive concepts disclosed herein.
Figure 3B:
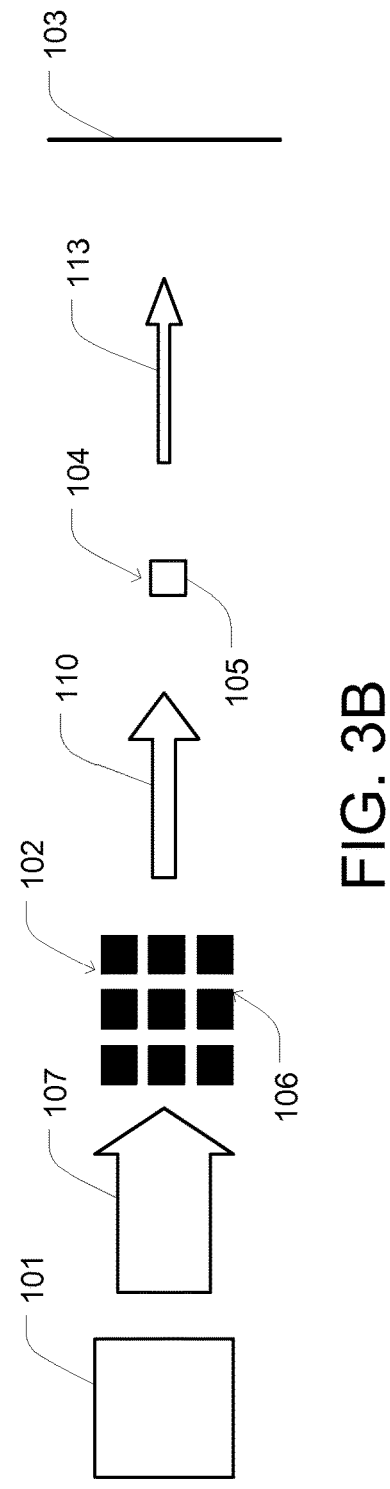
FIG. 3B is a schematic diagram of an exemplary embodiment of pixels of first and second spatial light modulators being driven in a low-end mode according to the inventive concepts disclosed herein.
Figure 3C:
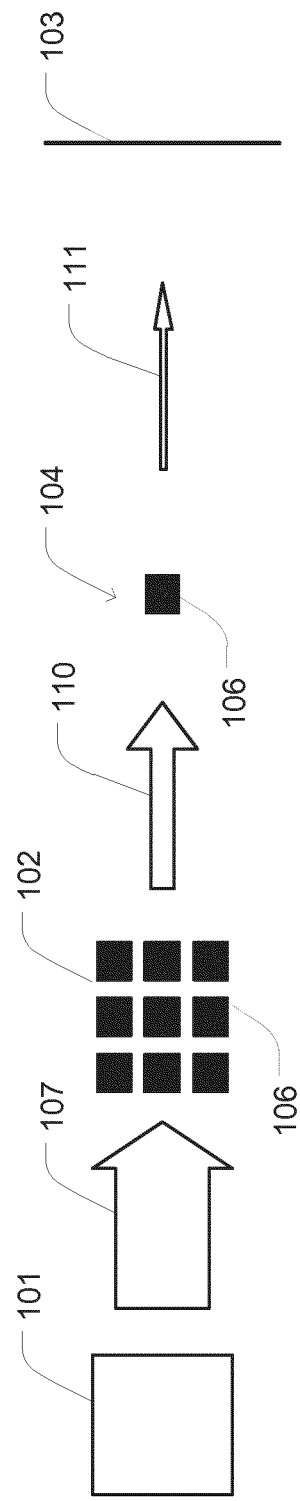
FIG. 3C is a schematic diagram of an exemplary embodiment of pixels of first and second spatial light modulators being driven in an OFF state for a high-end mode or a low-end mode according to the inventive concepts disclosed herein.

Referring now to FIGS. 3A-3C, various embodiments of pixels mappings for the image modulation apparatus 100 are illustrated according to the inventive concepts disclosed herein. In some embodiments, the image modulation apparatus 100 is configured to adjust the image on the first SLM 102 (e.g., an image output by the first SLM 102 as first modulated light 108) to compensate for modulator misalignment and diffusion in the optics, which would otherwise cause pixels on the first SLM 102 to not be exactly mapped onto the corresponding pixels on the second SLM 104. Both high-end and low-end modes can be achieved by rapidly switching the SLMs 102, 104 (e.g., pixels thereof) between their respective ON states (FIG. 3A for high-end mode; FIG. 3B for low-end mode) and OFF states (FIG. 3C) to produce the required intensity level. FIGS. 3A-3C illustrate exemplary embodiments where a group of nine first pixels of the first SLM 102 contribute to the light falling on a second pixel of the second SLM 104 (e.g., the group of nine first pixels correspond to the second pixel). In various embodiments, the number of first pixels in the group could be more or less than nine, depending on the configuration of the image modulation apparatus 100.

In some embodiments, as shown in FIG. 3A, the image modulation apparatus 100 is configured to operate in high-end mode. FIG. 3A illustrates a similar configuration as FIG. 1A, except that the first SLM 102 is illustrated by a group or plurality of first pixels, and the second SLM 104 is illustrated by a second pixel. In embodiments where the first pixels of the first SLM 102 do not have a one-to-one correspondence to second pixels of the second SLM 104, a number (or group) of first pixels of the first SLM 102 will each contribute to the light falling on a second pixel of the second SLM 104 (e.g., each of the first pixels of the group of the first SLM 102 as shown in FIG. 3A correspond to the second pixel of the second SLM 104). The image modulation apparatus 100 can be configured to drive all of the group of first pixels of the first SLM 102 in the ON state 105 to achieve maximum light intensity from the ON state pixel (also driven in the ON state 105) of the second SLM 104 (and thus the second modulated light 109).

In some embodiments, as shown in FIG. 3B, the image modulation apparatus 100 is configured to operate in low-end mode. Similar to FIG. 3A, in embodiments where the first pixels of the first SLM 102 do not have a one-to-one correspondence to pixels of the second SLM 104, a number (or group) of first pixels of the first SLM 102 will each contribute to the light falling on a second pixel of the second SLM 104 (e.g., each of the first pixels of the group of the first SLM 102 as shown in FIG. 3B correspond to the second pixel of the second SLM 104). The image modulation apparatus 100 is configured to drive the first pixels of the first SLM 102 corresponding to the second pixel of the second SLM 104 in the OFF state 106, to ensure that no light falls on the second pixel of the second SLM 104 while second pixel is in the ON state 105.

For example, as shown in FIG. 3B, the image modulation apparatus 100 is configured to operate in low-end mode by driving the first pixels of the first SLM in the OFF state 106 (to output the first light 110 as leakage light) and driving the corresponding second pixel of the second SLM 104 in the ON state 105 (to modulate the leakage light 110 and output the second modulated light 113 as pass through of leakage). FIG. 3B illustrates a similar configuration as FIG. 1D, except that the first SLM 102 is illustrated by a group or plurality of first pixels, and the second SLM 104 is illustrated by a second pixel. To achieve low-end mode with high fidelity to the image information of the drive signal, the image modulation apparatus 100 can be configured to ensure that the second pixel of the second SLM 104 receives leakage light from each of the corresponding first pixels of the first SLM 102 by driving each of the corresponding first pixels in the OFF state 106.

As shown in FIG. 3C, for both high-end mode and low-end mode, in some embodiments the OFF state can be achieved by driving the first pixels of the first SLM 102 in the OFF state 106, and driving the corresponding second pixel of the second SLM 104 in the OFF state 106. FIG. 3C illustrates a similar configuration as FIG. 1B, except that the first SLM 102 is illustrated by a group or plurality of first pixels, and the second SLM 104 is illustrated by a second pixel. The first pixels of the first SLM 102 receive light 107 and output first light 110 (e.g., leakage light); the second pixel of the second SLM 104 receives first light 110 and outputs second light 111 (e.g., leakage of leakage light).

As described previously, in some embodiments, when operating in the low-end mode, the image modulation apparatus 100 is configured to compensate for the relatively reduced intensity of light from the first SLM 102 to the second SLM 104 by increasing the fraction of the frame time that the second SLM 104 is driven in the ON state relative to high-end mode (or vice versa where the first SLM 102 is modulated between ON/OFF states while the second SLM 104 is in the OFF state). As will be appreciated from FIGS. 3A-3C, where multiple pixels of the first SLM 102 correspond to one or more pixels of the second SLM 104, compensating the image may also impact the light falling onto other nearby pixels on the second SLM 104. Generally this will be acceptable as the contrast ratio of modulator pixels is such that a bright pixel next to a dim pixel will still be significantly different and thus any impact of compensating the image on the first modulator will not be noticeable. However, when adjacent second modulator pixels need to operate in different modes (high-end and low-end) this could create a problem if the second modulator pixels' ON state periods occur at the same time.

Figure 4A:
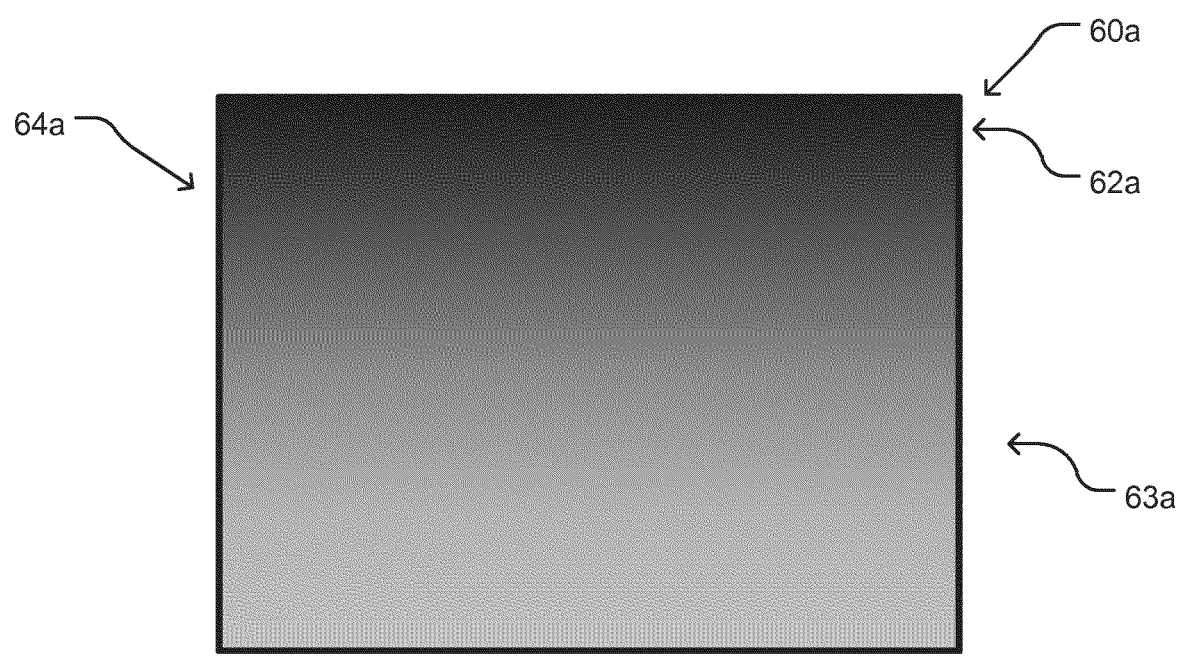
FIG. 4A is a schematic diagram of an exemplary embodiment of an image output by an image modulation apparatus in which a greyscale ramp is correctly represented according to the inventive concepts disclosed herein.
Figure 4B:
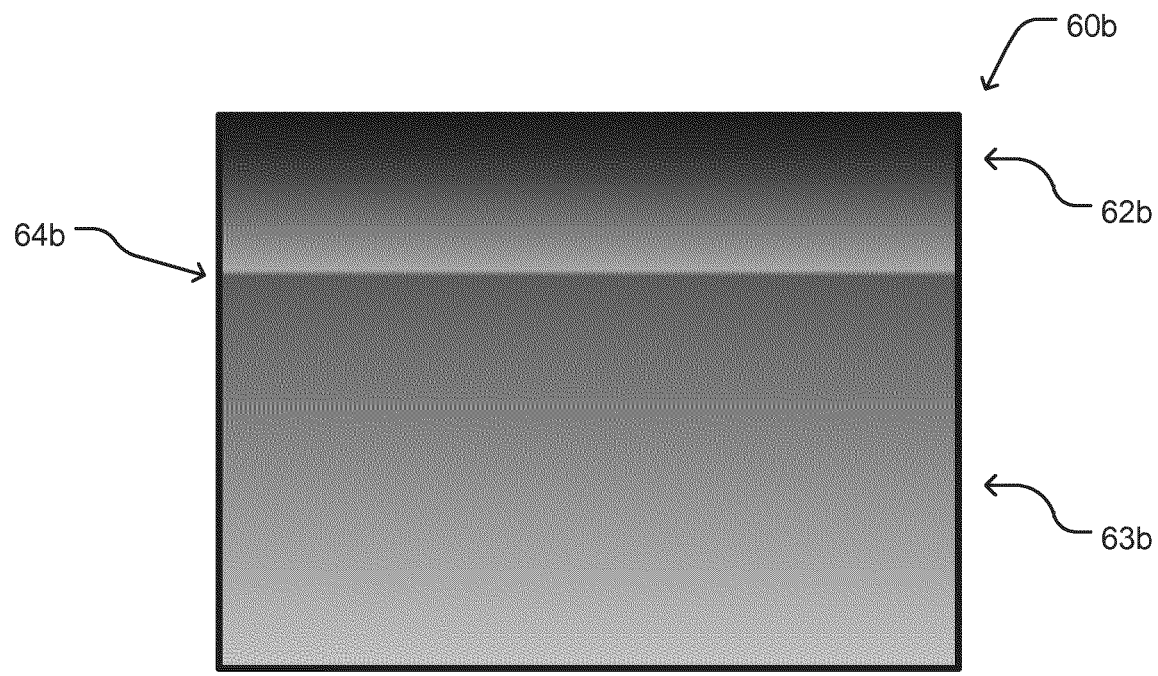
FIG. 4B is a schematic diagram of an exemplary embodiment of an image output by an image modulation apparatus in which a greyscale ramp is incorrectly represented according to the inventive concepts disclosed herein.

Referring now to FIGS. 4A-4B, in some embodiments according to the inventive concepts disclosed herein, the image modulation apparatus 100 is configured to adjust for gradual changes in light intensity levels between adjacent or nearby pixels. FIG. 4A illustrates a projected image 60a (e.g., projected by a projector or other image display apparatus incorporating the image modulation apparatus 100) in which a grey scale ramp is correctly represented; there is a smooth transition in light intensity from white to black. In some embodiments, the image information used to drive the image modulation apparatus 100 may indicate that both high-end and low-end modes of operation take place in the same frame, as pixel data in any one frame may be mixed (relatively bright and relatively dim). Dim pixels may require low-end mode, and bright pixels may require high-end mode.

In some images, correctly representing a range of grey scales in the same frame of the image may be difficult where the image has gradual changes in intensity, such as where adjacent pixels will transition from low-end mode to high-end mode. An example of such an image, illustrating the advantages of an image modulation apparatus according to the inventive concepts disclosed herein, is a grey scale ramp where the image gradually transitions from black up to a higher level that requires high-end mode to achieve, although the higher level is still significantly dimmer than a full ON white level. The image shown in FIG. 4A is representative of gradual transitions that can occur in real world images.

As shown in FIGS. 4A-4B, the projected image 60a can include a region 62a in which dim pixels are projected by operating the image modulation apparatus 100 in low-end mode, where the first SLM 102 is driven in the OFF state and the second SLM 104 is modulated between ON and OFF states based on the intensity indicated by an input signal. The projected image 60a can also include a region 63a in which bright pixels are projected by operating the image modulation apparatus in high-end mode, wherein the first SLM 102 and the second SLM 104 are both modulated between ON and OFF states based on the intensity indicated by the input signal. While in FIG. 4A, there is no discernible transition 64a between the low-end mode to high-end mode pixels, in FIG. 4B, such a transition 64b is discernible in projected image 60b. In some embodiments, the image modulation apparatus 100 correctly represents an image (e.g., an image having gradual transitions in light intensity and/or a pixel to be driven in low-end mode adjacent to a pixel to be driven in high-end mode) by increasing the fraction of the frame time for which the low-end pixel is driven in the ON state relative to the fraction it would have been driven in high-end mode to compensate for the relatively large step in intensity that would otherwise occur between low-end mode and high-end mode.

Figure 5:
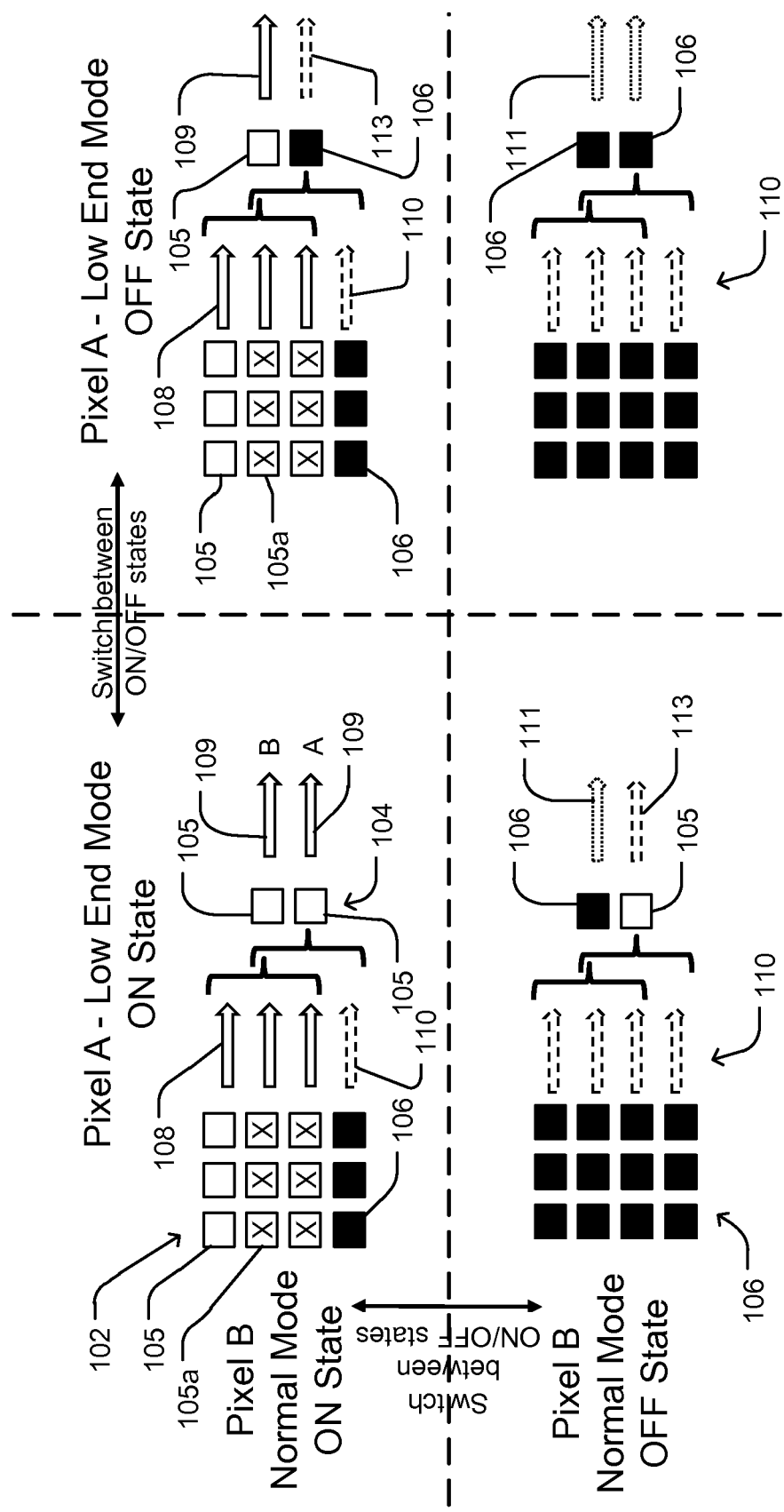
FIG. 5 is a schematic diagram illustrating an exemplary embodiment of operation of an image modulation apparatus in high-end and low-end modes according to the inventive concepts disclosed herein.

Referring now to FIG. 5, a schematic diagram is shown according to an exemplary embodiment of the inventive concepts disclosed herein, illustrating how the image modulation apparatus 100 can be configured to modify operation of the SLMs 102, 104 to compensate for conflict between the low-end mode and high-end mode, such as where adjacent or nearby pixels are driven in both low-end and high-end mode (e.g., a first pixel of the first SLM 102 may be expected to operate in high-end mode based on its correspondence to one of the second pixels of the second SLM 104, and in low-end mode based on its correspondence to another of the second pixels of the second SLM 104). FIG. 5 illustrates an embodiment where groups of nine first pixels of the first SLM 102 correspond to second pixels of the second SLM 104; however, the inventive concepts disclosed with reference to FIG. 5 may be applied to various other configurations or embodiments with varying correspondence between first pixels of the first SLM 102 and second pixels of the second SLM 104. In some embodiments, each screen pixel (e.g., each pixel of the resultant image to be displayed on the screen 103) is produced by a single pixel on the second SLM 104, but due to modulator misalignment and optical aberration or diffraction, by a number of pixels on the first SLM 102.

As shown in FIG. 5, the upper group of nine first pixels correspond to the second pixel B, and the lower group of nine first pixels correspond to the second pixel A. As indicated by the "x" for first pixels 105*a* that correspond to both the second pixel A and the second pixel B, in FIG. 5, driving the first pixels in high-end mode takes priority over driving the pixels in low-end mode (e.g., the first pixels 105*a* are preferentially driven in high-end mode if the image information driving the pixels indicates that the first pixels 105*a* are to be in high-end mode based on their correspondence to second pixel B and in low-end mode based on their correspondence to second pixel A). For example, as shown in FIG. 5, in their ON states:

each low-end mode pixel on the second SLM 104 requires the relevant group of pixels on the first SLM 102 to be OFF when the second modulator pixel is ON; and each high-end mode pixel on the second modulator requires the relevant group of pixels on the first SLM 102 to be ON when the second modulator pixels is ON.

If the low-end and high-end mode pixels are adjacent (or nearby), then the requirements for the state of the pixels on the first SLM 102 will conflict. Nearby pixels may include those which are not necessarily adjacent to a target pixel, yet the operation of which still affects the operation of the target pixel (e.g., one pixel away, two pixels away, less than four pixels away; less than a threshold number of pixels away where corresponding first pixels of the first SLM 102 output light to the target pixel of the second SLM 104).

In some embodiments, the image modulation apparatus 100 resolves the conflict between driving first pixels in high-end mode and low-end mode by at least one of (1) prioritizing high-end mode over low-end mode when driving the first pixels of the first SLM 102 that correspond to both a second pixel to be driven in high-end mode and a second pixel to be driven in low-end mode or (2) decreasing the fraction of frame time that the second pixel of the second SLM 104 that is in low-end mode is driven in the ON state (which may be a separate modification to the ON state fraction of the frame time from increasing the ON state fraction to compensate for the drop to leakage light due to operating the first SLM 102 in the OFF state).

An image modulation apparatus according to the inventive concepts disclosed herein can allow nearby pixels to operate in both high-end and low-end mode without producing a noticeable problem to the resultant image. An image modulation apparatus according to the inventive concepts disclosed herein can allow a DMD-based projector to operate simultaneously in both high-end and low-end modes within the same video frame (e.g., operate some pixels in high-end mode and other pixels in low-end mode, even if the high-end mode pixels and low-end mode pixels are nearby or adjacent), with single pixels or larger areas operating in the most appropriate mode.

For example, still referring to FIG. 5, consider two adjacent pixels of slightly different intensities but one in low-end mode and one in high-end mode, as shown for pixels B and A, respectively. The pixels may have slightly different intensities where, for example, pixel A (or a pixel in the resultant image corresponding to pixels A) is to generate a light intensity that is slightly less than (or slightly less than or equal to) an intensity at which the image modulation apparatus 100 is configured to transition between low-end mode and high-end mode, as described herein with reference to FIGS. 2A-2B, and pixel B (or a pixel in the resultant image corresponding to pixels B) is to generate a light intensity that is slightly greater than or equal to (or slightly greater than) the intensity at which the image modulation apparatus 100 is configured to transition between low-end mode and high-end mode.

Pixel A (low-end mode) is generated by rapidly switching between low-end mode ON and OFF states (the first SLM 102/second SLM 104 are modulated between corresponding OFF/ON and OFF/OFF states). Pixel B (high-end mode) is generated by rapidly switching between high-end mode ON and OFF states (the first SLM 102/second SLM 104 are modulated between corresponding ON/ON and OFF/OFF states). For these slightly different intensities, the low-end mode ON state time will be significantly longer than the high-end mode ON state time, as the image modulation apparatus 100 is configured to increase the fraction of the frame time that the second pixel A is driven in the ON state to compensate for the first pixels of the first SLM 102 being expected to be driven in the OFF state.

In configurations such as shown in FIG. 5, when pixel B is in the ON state, there will always be a conflict with the adjacent pixel A. Pixel B requires its corresponding group of first pixels on the first SLM 102 to be ON. Pixel A requires its corresponding group of first pixels to be OFF. Since the two groups overlap, there is conflict (e.g., conflict in overlapping first pixels 105*a*).

In some embodiments, the image modulation apparatus 100 is configured to control operation of the first pixels 105*a* (e.g., those first pixels 105*a* which correspond to both a second pixel to be driven in high-end mode, such as pixel B, and a second pixel to be driven in low-end mode, such as pixel A; those first pixels 105*a* which correspond to both a second pixel to be driven in high-end mode and an adjacent or nearby second pixel to be driven in low-end mode) based on a priority heuristic (e.g., rule, decision, decision tree, function). In some embodiments, such as shown in FIG. 5, the priority heuristic indicates that the image modulation apparatus 100 prioritize high-end mode by driving the first pixels 105*a* in high-end mode, which can allow maximum possible intensity for a fully ON pixel. In some embodiments, the priority heuristic indicates that the image modulation apparatus drive the first pixels 105*a* in high-end mode if the light intensity indicated by an input signal is greater than a threshold intensity for a transition between low-end mode and high-end mode (e.g., high-end mode is applied to higher intensity high-end pixels as well as lower intensity high-end mode pixels). It is to be appreciated that a more complex scheme could be devised.

As shown in FIG. 5, where the priority heuristic indicates that high-end mode is prioritized over low-end mode, pixel B appears with the desired intensity, while pixel A may appear with a higher intensity than desired (e.g., the low-end pixel A may be brighter than indicated by input image information for a resultant image to be displayed by the image modulation apparatus 100). In some embodiments, the image modulation apparatus 100 is configured to decrease the fraction of the frame time that second pixels of the second SLM 104 are driven in the ON state for low-end mode based on nearby pixels being driven in the ON state for high-end mode.

For example, the image modulation apparatus 100 can determine that one or more first pixels 105*a* correspond to both a second pixel B to be driven in high-end mode and a second pixel A to be driven in low-end mode. Responsive to this determination, the image modulation apparatus 100 can apply a priority heuristic to resolve the conflict between driving the first pixels 105*a* in both high-end mode and low-end mode. Based on the priority heuristic, the image modulation apparatus 100 can determine to prioritize high-end mode, and therefore drive the one or more first pixels 105*a* in high-end mode, and drive the second pixel B in high-end mode. Responsive to applying a priority heuristic that prioritizes high-end mode, the image modulation apparatus 100 can identify the second pixel A (which will be receiving more light than expected if all of its corresponding first pixels were driven in low-end mode) and decrease the fraction of the frame time that the second pixel A is driven in the ON state. Decreasing the fraction of the frame time that the second pixel A is driven in the ON state can prevent a noticeable impact on the intensity of low-end mode pixels by nearby high-end mode pixels.

In some embodiments, based on determining a conflict between the low-end mode and high-end mode, the image modulation apparatus 100 is configured to modify operation of the second pixel A by preventing the low-end mode second pixel A from having ON states at the same time as any nearby high-end mode pixel B. For example, high-end mode pixels during their ON state time can provide some intensity to nearby pixels, including low-end mode pixels. Switching the low-end mode pixels to their OFF states during the time nearby high-end mode pixels are in their ON state can compensate for low-end mode pixels having a noticeably incorrect intensity relative to the nearby normal mode pixels. For example, with reference to the configuration shown in FIG. 5, where the image modulation apparatus 100 determines that the pixel B is to be driven in high-end mode while the pixel A is to be driven in low-end mode, the image modulation apparatus 100 can compare the fractions and/or portions of the frame time during which the second pixel A is driven in the ON state to the fractions and/or portions of the frame time during which the second pixel B is driven in the ON state, identify if the second pixel A is to be driven in the ON state for any of the same portions (e.g., overlapping portions) of the frame time as the second pixel B, and drive the second pixel A in the OFF state for one or more of the identified same or overlapping portions.

In some embodiments, control of SLM pixel ON and OFF times is usually indirect by means of defining its intensity. It may be necessary to have previously mapped the precise ON and OFF times used for each intensity and any other controls provided by the modulator. For example, the image modulation apparatus 100 can receive an input signal having image information indicating a light intensity (e.g., a desired light intensity for a pixel of a resultant image), compute modulator intensities for each of the SLMs 102, 104 that will result in the indicated light intensity, and based on the modulator intensities, compute a respective fraction of a frame time for which the SLMs 102, 104 are driven in the ON state (e.g., a fraction of a frame time for which corresponding pixels of each SLM 102, 104 are driven in the ON state).

Figure 6:
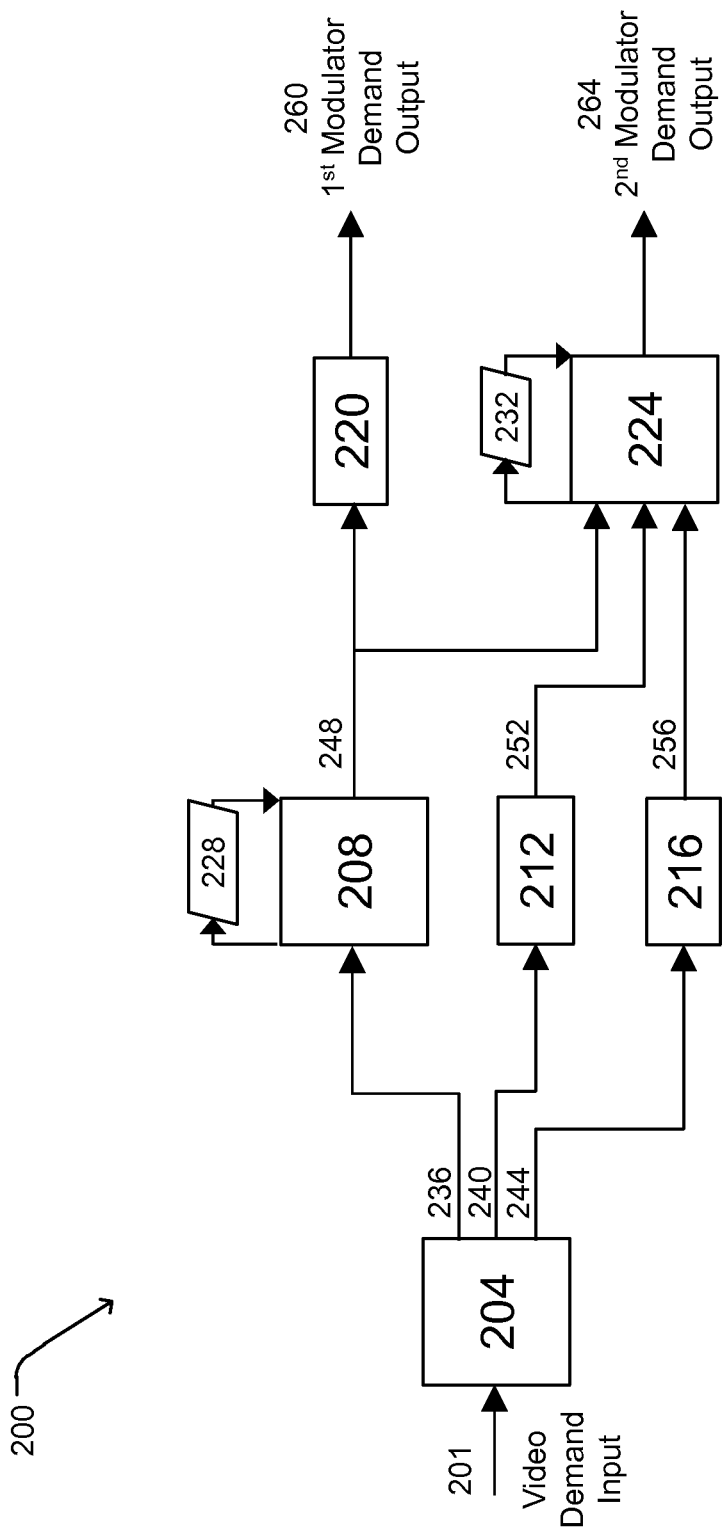
FIG. 6 is a block diagram of an exemplary embodiment of a system for controlling operation of an image display apparatus according to the inventive concepts disclosed herein.

Referring now to FIG. 6, an exemplary embodiment of a system 200 for controlling operation of an image modulation apparatus is shown according to the inventive concepts disclosed herein. The system 200 may be applied to the image modulation apparatus 100 (e.g., for generating drive signals for controlling the SLMs 102, 104). The system 200 may be implemented by various configurations of hardware, software, and/or firmware, such an electronic controller (e.g., electronic controller 308 described with reference to FIG. 8), such as an electronic controller incorporating a field programmable gate array, which may be an integrated circuit designed to be configured by a customer or a designer after manufacturing.

The system 200 includes a generator module 204. The generator module 204 is configured to receive a video demand input signal 201. The video demand input signal 201 may include a single color component or multiple color components (e.g., red/green/blue; red/green/blue/infrared; cyan/magenta/yellow/black or key). The video demand input signal 201 can be or include image information, video information, image data, video data, light intensity information, or other information that represents the video demand for each pixel. The video demand for each pixel can be an expected, desired, or commanded light intensity for light modulated by that pixel (including leakage, pass through, or combinations thereof as described with reference to FIGS. 1A-1D).

The generator module 204 is configured to determine a first modulator control signal 236 and a second modulator control signal 244 based on the video demand input signal 201. The modulator control signals can include the demand for each pixel of each SLM 102, 104. While the present disclosure describes the modulator control signals based on the example of an image modulation apparatus having a single first SLM 102 and a single second SLM 104, the inventive concepts disclosed herein can be applied to various combinations of numbers of SLMs (e.g., to an image display apparatus that incorporates a plurality of SLMs in one or both stages for a plurality of respective color channels). For example, the generator module 204 can process the video demand input signal 201 to determine a first light intensity for one or more first pixels of the first SLM 102, and to determine a second light intensity for one or more second pixels of the second SLM 104 corresponding to the first pixels. The light intensities may be determined such that a resultant image generated by the light modulation of the SLMs 102, 104 has a light intensity equivalent to a light intensity indicated by the video input demand signal 201. The generator module 204 may be configured to compute ON state and OFF state times (e.g., fractions of a frame time for which pixels are driven in the ON state) based on the determined first and second light intensities.

The generator module 204 is configured to determine whether to drive a pixel in high-end mode or low-end mode based on at least one of the video demand input signal 201 or an optical property of the image modulation apparatus being controlled by the generator module 204. In some embodiments, the generator module 204 is configured to compare the video demand input signal 201 to a predetermined threshold (e.g., compare a light intensity indicated by the video demand input signal 201 for a pixel and compare the indicated light intensity to a predetermined threshold). The predetermined threshold may be a light intensity level in a range from full OFF to full ON, and/or a light intensity level as described previously with reference to FIGS. 2A-2B. The generator module 204 outputs the determination of high-end mode or low-end mode as mode signal 240 (e.g., flags the mode using mode signal 240).

In some embodiments, if a pixel is to be driven or operated in high-end mode, then the video demands indicated by the first and second modulator control signals 236, 244 will be the same and equal to video demand input signal 201 (e.g., equal to a light intensity indicated by video demand input signal 201.

In some embodiments, if a pixel is to be driven or operated in low-end mode, the video demand (e.g., first light intensity) indicated by the first modulator control signal 236 (e.g., determined by the generator module 204) will be zero, and the video demand (e.g., second light intensity) indicated by the second modulator control signal 244 will be increased by a predetermined factor applied to the light intensity indicated by video demand input signal 201, as the second SLM 104 will be modulating leakage light (e.g., modulating a low level of light resulting from a minimum ON time of the first SLM 102).

In some embodiments, the system 200 includes an area filter module 208. The area filter module 208 is configured to increase a demand to a pixel (e.g., a pixel of the first SLM 102) based on demand to nearby pixels. The area filter module 208 can thus compensate for the dual modulator (mis)alignment and aberrations in the optics, and thus in some embodiments, the area filter module 208 may execute an area filter function that is at least partially determined based on the structure of the image modulation apparatus being controlled. In some embodiments, the area filter module 208 is configured to determine a post-filter first modulator control signal 248 based on the ON/OFF time demands for all nearby pixels; the area filter module 208 may be configured to combine these by executing a logically OR function on the ON/OFF time demands for all nearby pixels with the current pixel.

In some embodiments, the system 200 includes one or more delay modules 212, 216, 220 configured to apply a delay to respective control signals to synchronize operation of the first SLM 102 and the second SLM 104. For example, the delay module 220 can be configured to apply a delay to the first modulator control signal 236 or the post-filter first modulator control signal 248, such as for synchronizing or otherwise aligning ON/OFF times for pixels of the SLM 102 with corresponding pixels of the SLM 104. The system 200 can thus generate a first modulator demand output signal 260 (e.g., a signal configured to drive or control operation of the first SLM 102) based on the first modulator control signal 236, which may be modified by the area filter module 208 and/or the delay module 220. Throughout such embodiments, it may be necessary to take into account delays such that the resultant first modulator and second modulator demand outputs 260, 264 are coincident in time.

In some embodiments, the system 200 includes an on-time selector module 224. The on-time selector module 224 can be configured to generate a second modulator demand output signal 264 based on the second modulator control signal 244; the second modulator demand output signal 264 may also depend on at least one of the delayed mode signal 252 passed by the delay module 212 or the post-filter first modulator control signal 248.

In some embodiments, the on-time selector module 224 is configured to operate in high-end mode by passing through (e.g., re-transmitting) the delayed second modulator control signal 256. The on-time selector module 224 can be configured to generate the second modulator demand output signal 264 and/or operate in low-end mode (e.g., based on identifying that the second SLM 104 is to be driven in low-end mode based on the delayed mode signal 252) by modifying the delayed second modulator control signal 256 based on the post-filter first modulator control signal 248, which may indicate the state of the first SLM 102 (e.g., a state of first pixels corresponding to the second pixel to be driven by the second modulator demand output signal 264, such as a current pixel and nearby pixels). For example, this may be implemented by turning OFF the second modulator demand during the ON time of the first SLM 102, or by modifying the ON time for the second pixel of the second SLM 104 based on the ON time of the corresponding first pixels of the first SLM 102 as indicated by the post-filter first modulator control signal 248. The area of nearby pixels used by the on-time selector module 224 may not be identical to that used for the first modulator output. The on-time selector module 224 may use a larger area, in which case another output from area filter 208 could be provided (e.g., an output specific to the structure of the second SLM 104).

In some embodiments, the system 200 includes at least one lookup table (e.g., a lookup table of an electronic database) configured to store modulator ON/OFF times for all video demand levels. For example, the lookup table can include a mapping of a light intensity level to a fraction of a frame time a pixel is to be driven in an ON state to result in the light intensity level. A module can perform a lookup in the lookup table based on the video demand level to retrieve the corresponding modulator ON/OFF times. As shown in FIG. 6, in some embodiments, the area filter module 208 is operatively coupled to a lookup table 228, and may retrieve ON/OFF times from the lookup table 228 based on the first modulator control signal 236. Similarly, in some embodiments, the on-time selector module 224 is operatively coupled to a lookup table 232, and may retrieve ON/OFF times based on the delayed second modulator control signal 256.

In some embodiments, the system 200 is configured to dither between video frames to provide more grey scale level resolution than can be provided in one frame. For example, the system 200 (or the modules thereof) may be configured to apply dither after generating first modulator demand output 260 and the second modulator demand output 264, respectively for each SLM. In other embodiments, if no dither is applied after these outputs (or in addition to any dither) then dither could be applied prior to the generator module 204 receiving video demand input signal 201 (e.g., when generating the video demand input signal 201), or the generator module 204 could generate the signals 236, 244 to be dithered.

As noted above, the system 200 has been described in terms of a dual DMD architecture, with one first SLM 102 and one second SLM 104. Such an architecture could be used for example, for a monochrome display device or a color sequential device. Multiple such devices could be used to provide a color parallel display. In each case, color could include visible light (for example red, green and blue) or non-visible light (for example infrared used for night vision simulation applications) or a combination of visible and non-visible light.

Figure 7:
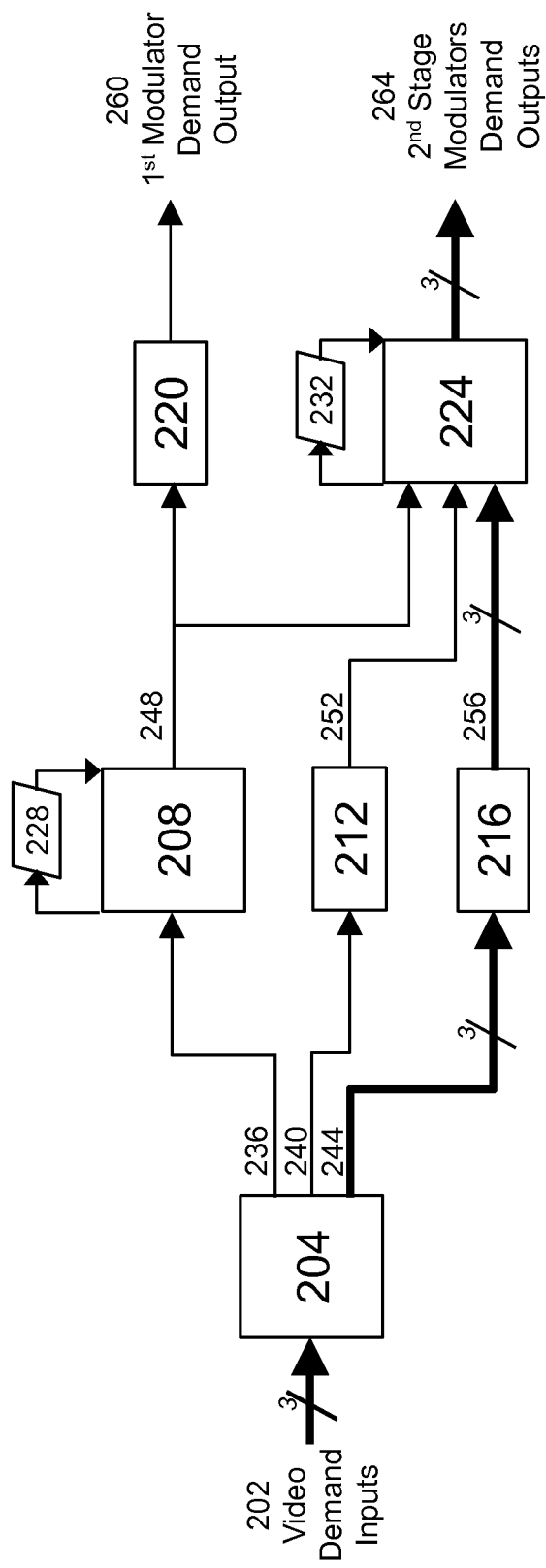
FIG. 7 is a block diagram of another exemplary embodiment of a system for controlling operation of an image display apparatus according to the inventive concepts disclosed herein.

The architecture discussed so far may be expanded using multiple SLMs in the first and/or the second stages. Referring now to FIG. 7, the system 200 is shown for an image display apparatus having an architecture with a single SLM for the first stage, and three modulators for the second stage, is illustrated according to an embodiment of the inventive concepts disclosed herein. Various numbers of SLMs could be used for the first stage and the second stage. The architecture using the single SLM for the first stage and three SLMs for the second stage is referred to herein below as one onto three SLMs. The first stage SLM modulates all wavelengths of light. Each of the second stage SLMs modulates a different wavelength range (for example red, green or blue). One of the second stage SLMs may modulate non-visible light (for example infrared). This function could be separate or combined with the modulation of visible light.

As shown in FIG. 7, three or more video demand input signals 202 are received by the generator module 204. The generator modulator 204 determines the appropriate demands for the first SLM 102 and second SLMs 264 for each pixel, and determines if the pixel shall operate in high-end or low-end mode by reference to a predetermined threshold, and outputs this determination this using mode signal 240. As there is a single first stage SLM 102, any given pixel location on the second SLMs will either operate in high-end or low-end mode. That is, all pixels in the same location on each of the three second stage SLMs will always use the same mode. All three will either use low-end mode, or all three will use high-end mode. The on-time selector module 224 will operate in a similar manner as for the single second stage SLM embodiments described with reference to FIG. 6.

Figure 8:
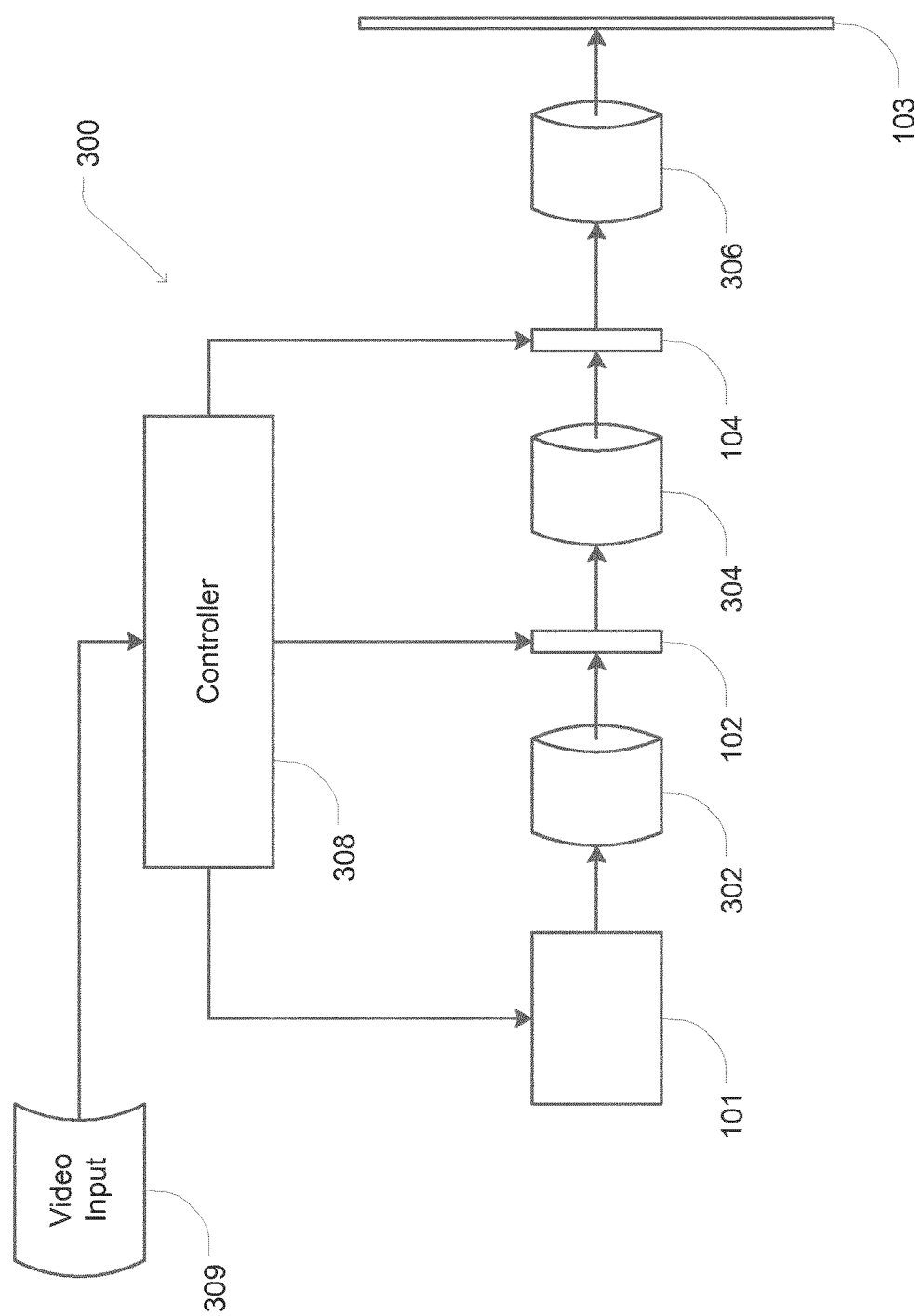
FIG. 8 is a block diagram of an exemplary embodiment of an image display apparatus according to the inventive concepts disclosed herein.

Referring now to FIG. 8, a schematic diagram of an embodiment of an image display apparatus 300 is shown according to the inventive concepts disclosed herein. The image display apparatus 300 may include features of the image modulation apparatus 100 and the system 200 described above. Briefly, the image display apparatus 300 includes a light source 101, illumination optics 302, the first SLM 102, relay optics 304, the second SLM 104, projection optics 306, a screen 103, and a controller 308 configured to drive the components of the image display apparatus 300 based on a video input signal 309. In embodiments such as shown in FIG. 8, the SLMs 102, 104 are configured as transmissive SLMs. The SLMs 102, 104 are arranged optically in series. The light source 101 can be, for example, a lamp, an LED light source, or a laser light source. The relay optics 304 is configured to image light from first pixels of the first SLM 102 onto corresponding second pixels of the second SLM 104. The relay optics 104 can be or include a lens system, which may be entirely or partly refractive; the relay optics 104 can be mirror-based.

The controller 308 (e.g., electronic controller, processing circuit, processing electronics, control circuit, control hardware) can be configured to perform various operations according to the inventive concepts disclosed herein, including generating and outputting drive signals for controlling operation of the SLMs 102, 104. The controller 308 can include a memory and a processor configured to execute instructions stored in the memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor 240 and includes computer code or instruction modules for executing one or more processes described herein. The memory includes various circuits, software engines, and/or modules that cause the processor to execute the systems and methods described herein. For example, the memory can include the modules of the system 200 described herein with reference to FIGS. 6-7, such that when the processor executes the modules, the operations for controlling the SLMs 102, 104 shown for the system 200 can be performed.

The image display apparatus 300 can be configured to achieve an enhanced contrast ratio where operated in a mode where pixels on one of the SLMs is used in the OFF state while the corresponding pixel or pixels in the other SLM are in the ON state (e.g., low-end mode). In some embodiments, the image display apparatus 300 is configured to reduce the impact of high-end mode pixels on nearby or adjacent low-end mode pixels by monitoring an area around each low-end mode pixel, and when high-end mode pixels are encountered in the ON state, then the low-end mode pixel is adjusted (e.g., the ON time for the low-end mode pixel is increased or decreased depending on whether more or less light is needed to accurately output the desired light intensity).

In some embodiments, the pixels around each high-end mode pixel may be monitored, and when low-end mode pixels are encountered, the ON state period of the low-end mode pixel may be adjusted. In some embodiments, rather than adjusting the ON time for the low-end mode pixel, it is the ON state period(s) on some or all of the high-end mode pixels that is/are adjusted. In some embodiments, the ON state period(s) of some or all of the high-end mode pixels and the low-end mode pixels may be adjusted.

In some embodiments, the image display apparatus 300 is configured to adjust the low-end mode pixel by changing its ON state to its OFF state for some or all of the time when it is coincident with any of the ON states of the nearby or adjacent high-end mode pixels (e.g., near enough to influence the intensity of the low-end mode pixel).

In some embodiments, the adjustment applied to the low end mode pixel may be to move its ON state to a different point in time such that it is not coincident, or less coincident with the ON state points in time of high-end mode pixels near enough to influence the intensity of the low end mode pixels. Such adjustments may be applied to the high-end mode pixels instead (e.g., decrease the ON state time of the high-end mode pixel where the ON state time of the low-end mode pixel would be increased), or to various combinations of the low-end mode and high-end mode pixels. The image display apparatus 300 can be configured to use low-end mode and high-end mode on different pixels, either at the same time or at different times, for example during the same video frame or during different video frames.

Figure 9:
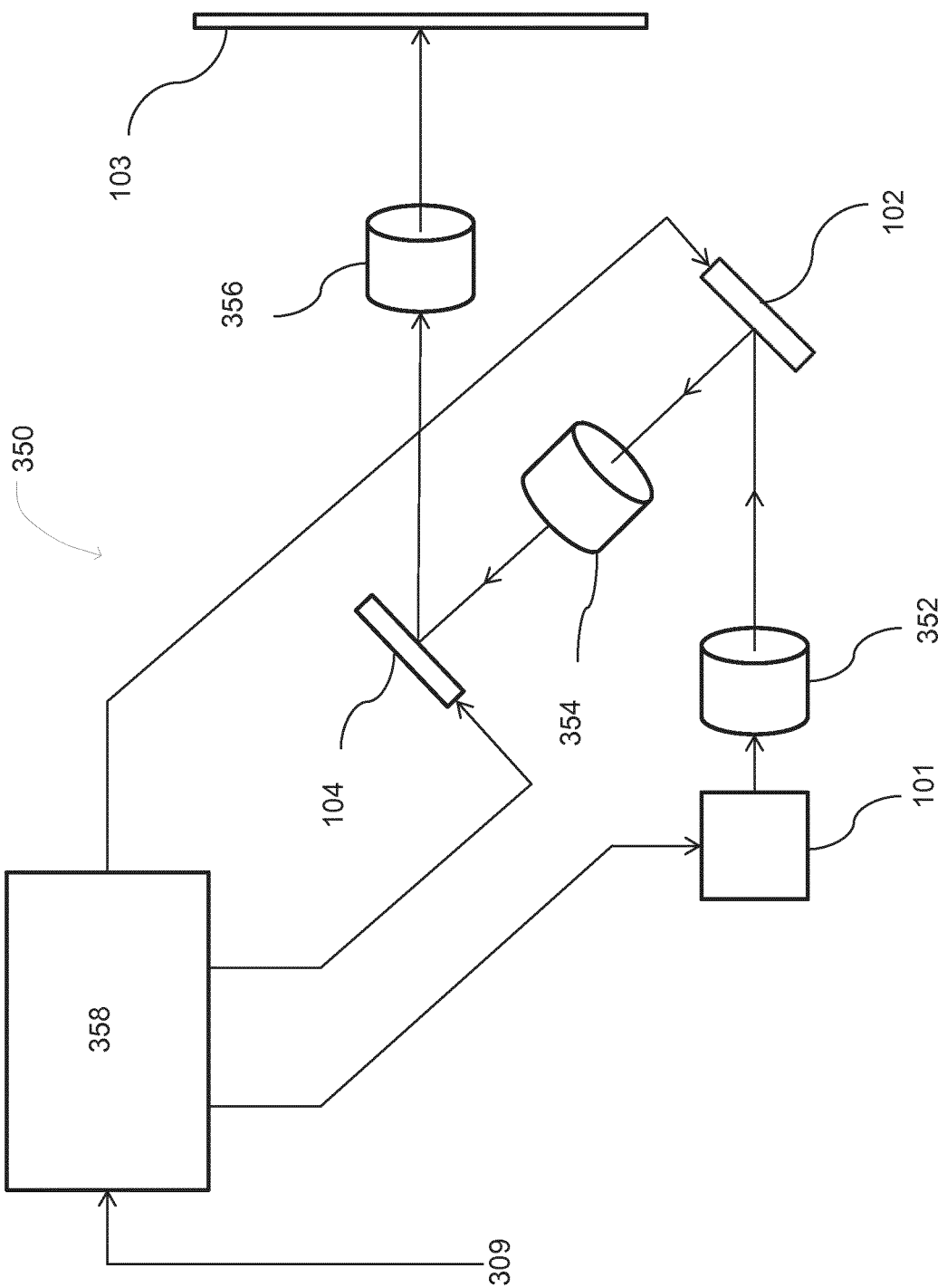
FIG. 9 is a block diagram of another exemplary embodiment of an image display apparatus according to the inventive concepts disclosed herein.

Referring now to FIG. 9, a schematic diagram of an embodiment of an image display apparatus 350 is shown according to the inventive concepts disclosed herein. The image display apparatus 350 is similar to the image display apparatus 300 described with reference to FIG. 8, except that the SLMs 102, 104 are configured as reflective SLMs (e.g., binary SLMs; DMDs).

In some embodiments, an image modulation apparatus according to the inventive concepts disclosed herein can be configured such that the pixels of each SLM have two states which are nominally ON or OFF, with a finite minimum ON time and a finite light output leakage in the OFF state, and with intermediate modulation values being obtained by pixels spending an appropriate fraction of frame time in the ON state. An electronic controller can be configured to drive the pixels in a high-end mode (e.g., normal mode) for pixels modulating bright parts of an image, and in a low-end mode for pixels modulating dark parts of the image, where in the high-end mode, corresponding pixels in each SLM are operated synchronously such that pixels of one SLM are ON for at least all the time that pixels of the other SLM are ON, and switched between ON and OFF states at the same time, and wherein in the low-end mode, pixels in one of the SLMs are switched OFF while corresponding pixels in the other SLM are switched between states to modulate leakage light from the OFF pixels. The electronic controller can be configured to ensure a smooth transition between the high-end mode and the low-end mode by utilizing otherwise unused ON time in the frame for pixels modulating dark parts of the image in the low-end mode, thereby compensating for the drop to leakage light levels from the OFF pixels by appropriately increasing the fraction of the frame time for which the corresponding pixels of the other spatial light modulator are ON. The electronic controller can be configured to operate the low-end mode such that excessive modulation steps that would otherwise result from finite minimum pixel ON time are avoided, thereby resulting in a smooth variation of modulation across the whole modulation range.

Figure 10:
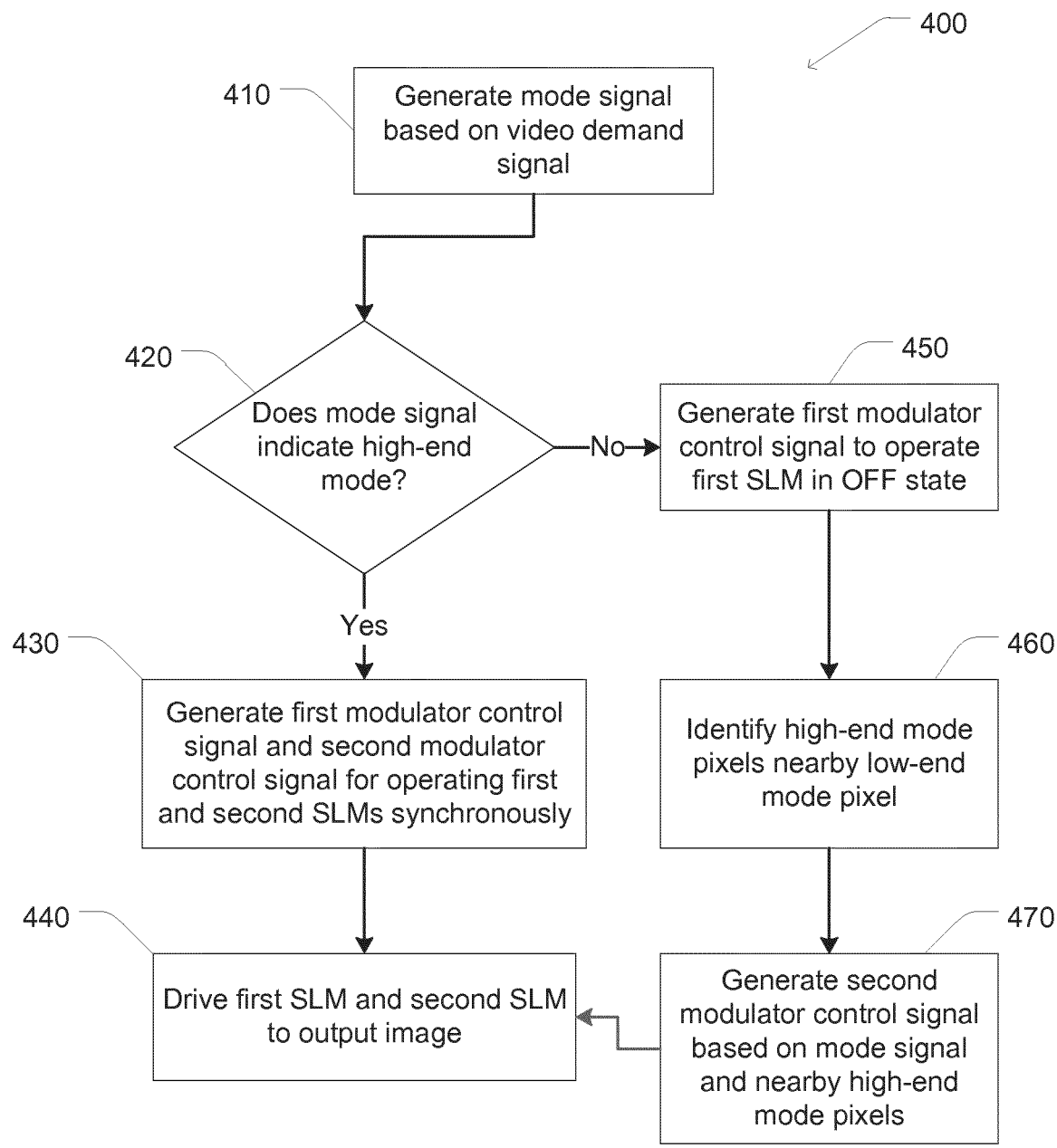
FIG. 10 is a flow diagram of an exemplary embodiment of a method of operating an image modulation apparatus according to the inventive concepts disclosed herein.

Referring now to FIG. 10, a method 400 for controlling operation of an image modulation apparatus is shown according to an embodiment of the inventive concepts disclosed herein. The method can be performed various components described herein, including the image modulation apparatus 100, the SLMs 102, 104, the system 200, and/or the image display apparatuses 300, 350, and may be performed according to various functions described herein.

At 410, a mode signal is generated based on a video demand signal. The video demand signal may indicate light intensities for each pixel of an image to be generated and displayed. The mode signal is generated to indicated whether a pixel is to be driven or generated in high-end mode or low-end mode. For example, the desired light intensity for the pixel can be compared to a threshold intensity, such as a threshold intensity below which low-end mode can be used to more accurately represent the desired light intensity than high-end mode.

At 420, it is determined whether the mode signal indicates operation in high-end mode or low-end mode. If the mode signal indicates high-end mode, then at 430, a first modulator control signal for controlling operation of a first SLM (e.g., an upstream SLM) and a second modulator control signal for controlling operation of a second SLM (e.g., a downstream SLM that is downstream of the first SLM in an optical path or a light path) are generated for operating the first and second SLMs synchronously, such as where the first and second SLMs are switched between their ON and OFF states synchronously. At 440, the first SLM and second SLM are driven based on the respective modulator control signals to output an image.

If the mode signal indicates low-end mode, then at 450, the first modulator control signal is generated to cause the first SLM to operate in the OFF state. At 460, high-end mode pixels nearby the low-end mode pixel are identified (e.g., those pixels for which ON state light from corresponding pixels of the first SLM falls on the second pixel).

At 470, the second modulator control signal is generated based on the mode signal and the identified nearby high-end mode pixels (e.g., each of the second pixels can be treated as a current pixel, and nearby high-end mode pixels to the current pixel can be identified). For example, a preliminary second modulator control signal can be generated by increasing the fraction of the frame time for which the second pixel of the second SLM is driven in the ON state relative to the fraction that it would have been driven in high-end mode, to compensate for the decreased light that the second pixel will receive from the first SLM (which is being driven in the OFF state). If there are nearby high-end mode pixels (which will have corresponding first pixels of the first SLM that are being driven in the ON state), then some of the light from the first SLM to be sent to the nearby high-end mode pixels will be received by the current second pixel; the ON state time for the current second can be reduced to compensate for the increased light that will be received from the ON state first pixels relative to the OFF state first pixel that may directly correspond to the current second pixel.

As will be appreciated from the above, systems and methods for an image modulation apparatus according to embodiments of the inventive concepts disclosed herein may improve operation of projectors and other image display apparatuses with multiple SLMs optically coupled in series by using both a high-end or normal mode and a low-end mode to more accurately represent all possible grey scale levels or light intensities for images to be displayed, including increasing a fraction of a frame time that low-end mode pixels of a second, downstream SLM are driven in an ON state to compensate for a reduction in light intensity from corresponding pixels of a first, upstream SLM.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A projector, comprising:
a first spatial light modulator comprising a plurality of first pixels, each first pixel having an ON state and an OFF state;
a second spatial light modulator optically coupled to the first spatial light modulator to receive light from the first spatial light modulator, the second spatial light modulator comprising a plurality of second pixels, each second pixel having an ON state and an OFF state, each second pixel corresponding to at least one first pixel; and
a processing circuit configured to:
determine whether to control the pixels of the spatial light modulators in a high-end mode or a low-end mode based on a video demand indicating greyscale levels for light output by the projector;
in the high-end mode, drive the at least one first pixel in the ON state for at least all of a fraction of a frame time that the corresponding second pixel is in the ON state, the fraction of frame time determined based on the greyscale level for the projector; and
in the low-end mode, drive the at least one first pixel in the OFF state while driving the corresponding second pixel between the ON and OFF states, wherein the fraction of the frame time for which the second pixel is in the ON state is increased to compensate for the at least one first pixel being in the OFF state.

2. The projector of claim 1, wherein the processing circuit is configured to determine to control the pixels of the spatial light modulators in the high-end mode based on the greyscale level for the light output by the projector being greater than a threshold value.

3. The projector of claim 2, wherein the processing circuit is configured to determine to control the pixels of the spatial light modulators in the high-end mode further based on greyscale levels for light output by the pixels adjacent to the second pixel.

4. The projector of claim 1, wherein the processing circuit is configured to determine whether to control the pixels of the spatial light modulators in the high-end mode or the low-end mode further based on at least one of a minimum ON time of the spatial light modulators, or an amount of dither used.

5. The projector of claim 1, wherein the processing circuit is further configured to decrease the fraction of the frame time for which the second pixel is in the ON state based on an adjacent second pixel being driven in the high-end mode.

6. The projector of claim 1, further comprising:
a light source; and
relay optics configured to image light from the first pixels onto the second pixels;
wherein the first spatial light modulator is configured to modulate light from the light source, and the second spatial light modulator is configured to modulate light from the relay optics to generate an image indicated by the video demand.

7. The projector of claim 1, wherein the spatial light modulators are reflective spatial light modulators.

8. The projector of claim 1, wherein the spatial light modulators are transmissive spatial light modulators.

9. A system, comprising:
a generator module configured to generate a first modulator control signal indicating a first fraction of a frame time for driving at least one first pixel of a first spatial light modulator in an ON state, a second modulator control signal indicating a second fraction of a frame time for driving a second pixel of a second spatial light modulator in an ON state, the second pixel corresponding to the at least one first pixel, and a mode signal indicating a high-end mode or a low-end mode;
a first control module configured to control operation of a first spatial light modulator based on the first modulator control signal and the mode signal, wherein in the high-end mode, the first control module is configured to output the first modulator control signal to the first spatial light modulator, and in the low-end mode, the first control module is configured to drive the at least one first pixel in an OFF state; and
a second control module configured to control operation of a second spatial light modulator based on the second modulator control signal and the mode signal, wherein in the high-end mode, the second control module is configured to output the second modulator control signal to the second spatial light modulator, and in the low-end mode, the second control module increases the second fraction when outputting the second modulator control signal to the second spatial light modulator to compensate for the OFF state of the first spatial light modulator.

10. The system of claim 9, wherein the generator module is configured to generate the first modulator control signal and the second modulator control signal based on a video demand, the video demand indicating at least one of a perceived intensity of light or a greyscale level.

11. The system of claim 9, wherein the generator module is configured to generate the mode signal based on a video demand, the video demand indicating at least one of a perceived intensity of light or a greyscale level, the mode signal indicating instructions to operate in the first mode if the at least one of the perceived intensity of light or the greyscale level is greater than a threshold value.

12. The system of claim 9, further comprising an area filter module configured to modify the first modulator control signal by increasing the first fraction based on video demand information for pixels adjacent to the second pixel.

13. The system of claim 9, further comprising at least one delay module configured to at least one of the first modulator control signal or the second modulator control signal such that the first modulator control signal and the second modulator control signal are coincident in time.

14. The system of claim 9, wherein the first fraction is greater than or equal to the second fraction.

15. The system of claim 9, wherein the second control module is configured to increase the second fraction based on ON/OFF times defined in a lookup table.

16. The system of claim 9, wherein the second control module is further configured to decrease the second fraction based on an adjacent second pixel being driven in the first mode.

17. A method, comprising:
generating a mode signal indicating whether to drive a first pixel of a first spatial light modulator and a second pixel of a second spatial light modulator according to a high-end mode or a low-end mode based on a video demand signal, the second pixel corresponding to the first pixel, each pixel configured to be in an ON state for a fraction of a frame time;
in the high-end mode, driving the first pixel and the second pixel synchronously based on the video demand signal; and
in the low-end mode, driving the first pixel in the OFF state while driving the second pixel with an increased fraction of the frame time relative to the high-end mode to compensate for the first pixel being driven in the OFF state.

18. The method of claim 17, wherein generating the mode signal further comprises comparing a light intensity indicated by the video demand signal to a threshold light intensity, the threshold light intensity selected based on a point at which the low-end mode more accurately represents a greyscale range than the high-end mode.

19. The method of claim 17, further comprising identifying a third pixel of the second spatial light modulator nearby the second pixel and driven in the high-end mode, and decreasing the fraction of the frame time that the second pixel is driven in the ON state based on the identified third pixel.

20. The method of claim 17, further comprising dithering the first pixel and the second pixel based on the video demand signal.

* * * * *